United States Patent [19]
Fox et al.

[11] Patent Number: 5,974,657
[45] Date of Patent: Nov. 2, 1999

[54] TWO STEP RESETTING OF MAGNETIZATION OF SPIN VALVE READ HEAD AT THE ROW LEVEL

[75] Inventors: Ciaran Fox, Los Altos; Hardayal Singh Gill, Portola Valley; Virgil Simon Speriosu, Goleta; Jila Tabib, San Jose, all of Calif.

[73] Assignee: International Business Machines Corporation, Armonk, N.Y.

[21] Appl. No.: 09/044,428

[22] Filed: Mar. 19, 1998

[51] Int. Cl.[6] .................................................. G11B 5/42
[52] U.S. Cl. ................................... 29/603.08; 29/603.09; 29/603.14; 148/108
[58] Field of Search ........................... 29/603.08, 603.09, 29/603.13, 603.14; 148/108; 360/113

[56] References Cited

U.S. PATENT DOCUMENTS

| | | | |
|---|---|---|---|
| 5,214,840 | 6/1993 | Imagawa et al. | 29/603.08 |
| 5,465,185 | 11/1995 | Heim et al. | 360/113 |
| 5,772,794 | 6/1998 | Uno et al. | 148/108 |

Primary Examiner—Carl E. Hall
Attorney, Agent, or Firm—Gary Cary Ware Freidenrich

[57] ABSTRACT

A method is provided for resetting the magnetization of the pinned and hard biasing layers of a spin valve read head at the row level. In a first embodiment of the invention a first magnetic field is applied substantially perpendicular to the air bearing surface (ABS) at room temperature for setting the magnetic moment of the pinned layer substantially perpendicular to the ABS followed by applying a second magnetic field substantially parallel to the ABS for setting the magnetic moments of the hard biasing layers substantially parallel to the ABS. In a second embodiment of the invention the antiferromagnetic pinning layer is also reset. This is done by heating the pinning layer with a current pulse conducted through the leads to the conductive layers of the spin valve head so that localized heating takes place adjacent the pinning layer as contrasted to ambient heating of the spin valve head. Simultaneous with the localized heating the first magnetic field is applied for orienting the magnetic spins of the pinning layer perpendicular to the ABS and resetting the magnetic moment of the pinned layer perpendicular to the ABS in a single domain state. Subsequently, a second magnetic field is applied for resetting the magnetic moment of the hard biasing layer parallel to the ABS in a single domain state.

43 Claims, 16 Drawing Sheets

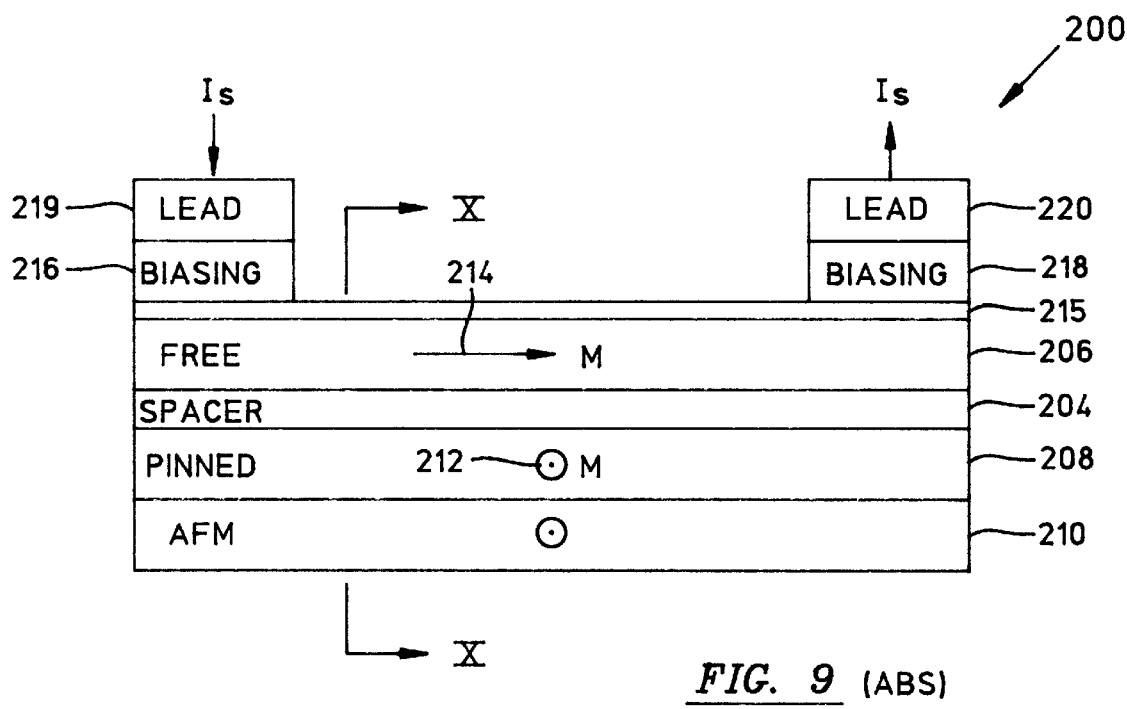
*FIG. 9* (ABS)
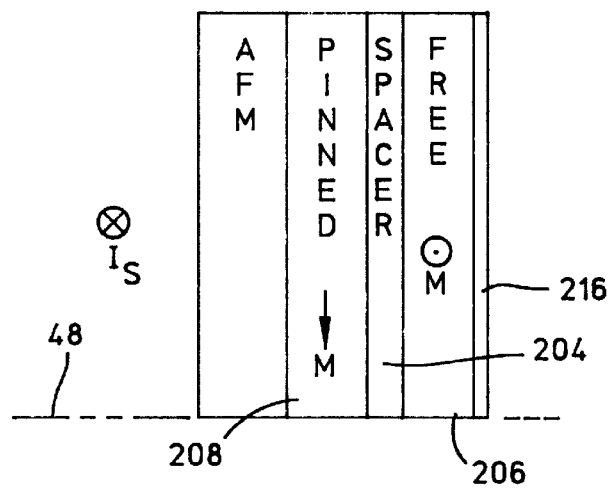
*FIG. 10*
(ROTATED 90°)

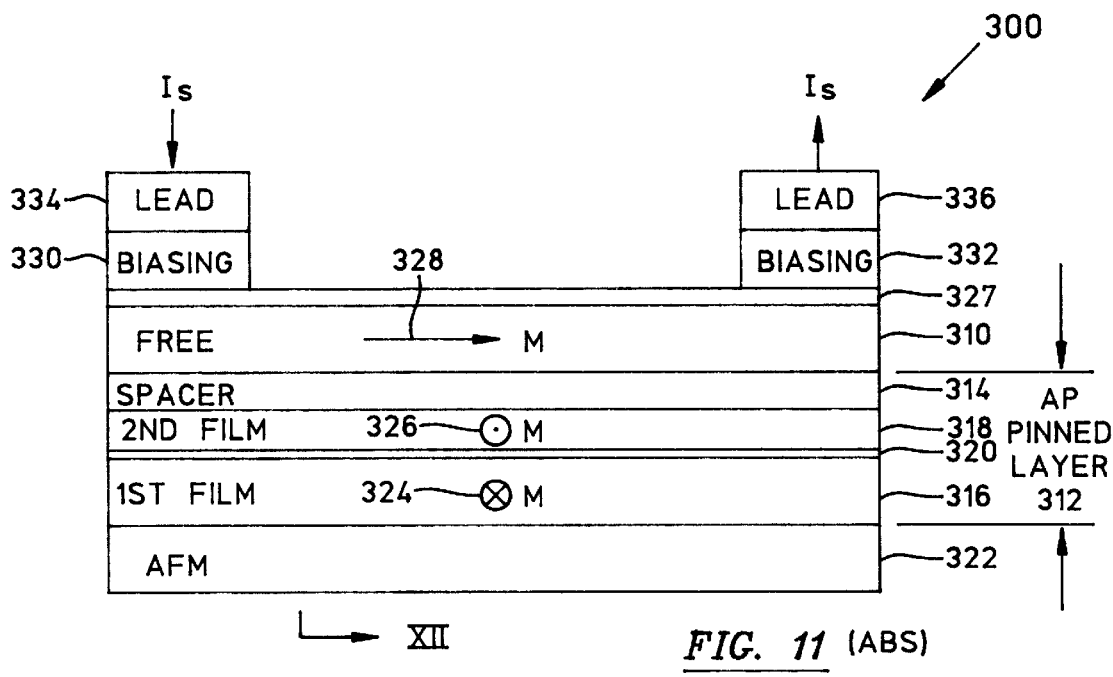
*FIG. 11* (ABS)
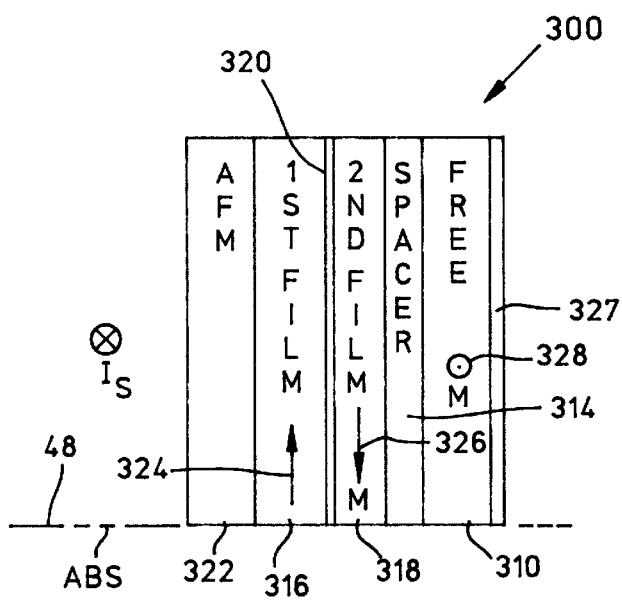
*FIG. 12*
(ROTATED 90°)

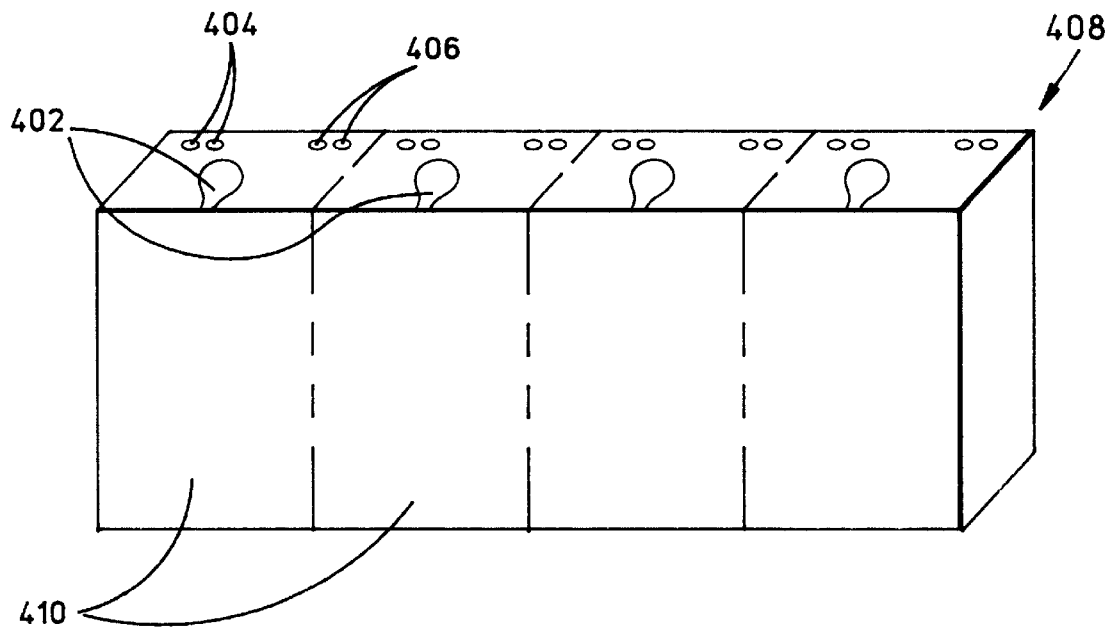
*FIG. 15*
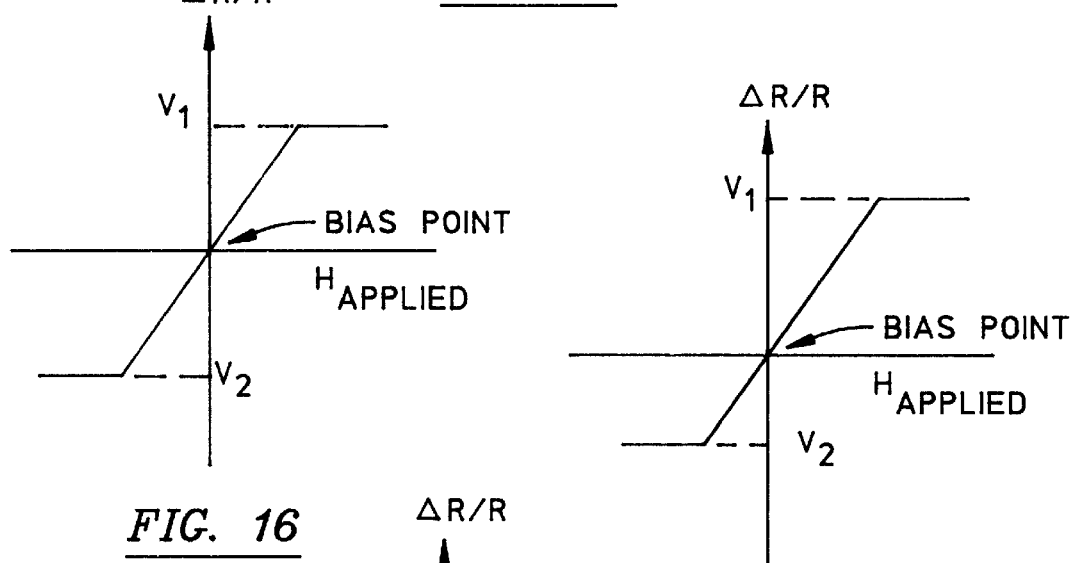
*FIG. 16*
*FIG. 17*
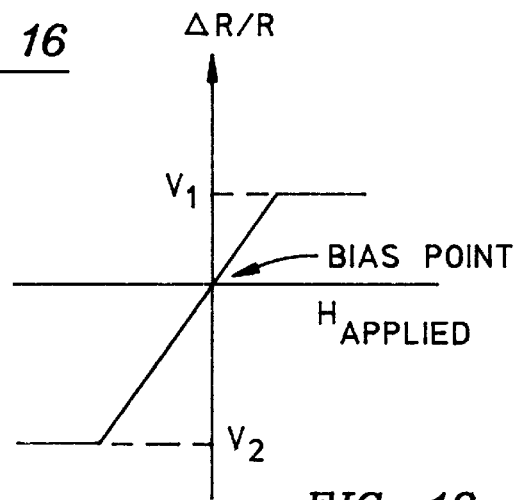
*FIG. 18*

First Magnetic Field

Second Magnetic Field

TWO STEP RESETTING OF MAGNETIZATION OF SPIN VALVE READ HEAD AT THE ROW LEVEL

BACKGROUND OF THE INVENTION

1. Field of the Invention

The present invention relates to a two step method of resetting magnetizations of a spin valve read head and, more particularly, to, first, applying a first magnetic field for resetting the magnetization of a pinned layer and, optionally, the orientation of magnetic spins of a pinning layer, and, second, applying a second magnetic field for resetting the magnetization of biasing layers of the head.

2. Description of the Related Art

A read head includes a spin valve sensor for sensing magnetic fields on moving magnetic media, such as magnetic disks or magnetic tapes. The sensor includes a nonmagnetic conductive layer, hereinafter a "spacer layer", sandwiched between first and second ferromagnetic layers, hereinafter a "pinned layer", and a "free layer", respectively. Hard biasing layers are connected to opposite end portions of the free layer for stabilizing the magnetic moment of the free layer in a single domain state. First and second leads are connected to the spin valve sensor for conducting a sense current therethrough. The magnetization of the pinned layer is pinned at about 90° to the magnetization of the free layer, and the magnetization of the free layer is free to respond to external magnetic fields. The magnetization of the pinned layer is typically pinned by exchange coupling with an antiferromagnetic layer, hereinafter a "pinning layer".

Preferably, the thickness of the spacer layer is less than the mean free path of conduction electrons through the sensor. With this arrangement, a portion of the conduction electrons is scattered by interfaces between the spacer layer and the pinned and free layers. When the magnetizations of the pinned and free layers are substantially parallel, scattering is minimal and the electrical resistance of the sensor is at a minimum. When the magnetizations of the pinned and free layers are substantially antiparallel, scattering is maximized and the electrical resistance of the sensor is at a maximum. Changes in scattering alter the electrical resistance of the spin valve sensor in proportion to $\sin \theta$, where $\theta$ is the angle between the magnetizations of the pinned and free layers. A spin valve sensor is characterized by a magnetoresistive (MR) coefficient (the ratio of the change in electrical resistance of the sensor to its maximum electrical resistance) that is substantially higher than the MR coefficient of an anisotropic magnetoresistive (AMR) sensor. For this reason a spin valve sensor is sometimes referred to as a "giant magnetoresistive" (GMR) sensor.

A read head employing a spin valve sensor (hereinafter, a "spin valve read head") may be combined with an inductive write head to form a combined magnetic head. In a magnetic disk drive, an air bearing surface (ABS) of a combined magnetic head is supported adjacent a rotating disk to write information on or read information from the disk. Information is written to the rotating disk by magnetic fields which fringe across a gap between the first and second pole pieces of the write head. In a read mode, the electrical resistance of the spin valve sensor changes proportionally to the magnitudes of the magnetic fields on the rotating disk. When a sense current $I_S$ is conducted through the spin valve sensor, electrical resistance changes cause potential changes that are detected and processed as playback signals.

Another type of spin valve sensor, an antiparallel (AP) pinned spin valve sensor, is described in commonly assigned U.S. Pat. No. 5,465,185 to Heim and Parkin, which is incorporated into this application by this reference. The AP pinned spin valve sensor differs from the pinned layer spin valve sensor, described above, in that the pinned layer of the AP pinned spin valve sensor comprises multiple thin films, which are collectively referred to as an antiparallel (AP) pinned layer, while the pinned layer of the pinned layer spin valve sensor is a single thin film layer. The AP pinned layer has a nonmagnetic spacer film, hereinafter referred to as an antiparallel (AP) coupling film, sandwiched between first and second ferromagnetic thin films. The first thin film is exchange coupled to the pinning layer by being immediately adjacent thereto, and has its magnetic moment directed in a first direction. The second thin film is immediately adjacent to the free layer and is exchange coupled to the first thin film by the minimal thickness (in the order of 5 Å) of the AP coupling film between the first and second thin films. The magnetic moment of the second thin film is oriented in a second direction that is antiparallel to the direction of the magnetic moment of the first film. The magnetic moments of the first and second films subtractively combine to provide a net pinning moment of the pinned layer. The direction of the net moment is determined by the thicker of the first and second thin films. The thicknesses of the first and second thin films are chosen to reduce the net moment. A reduced net moment results in a reduced demagnetization (demag) field from the AP pinned layer. Since the exchange coupling between the pinning layer and first thin film is inversely proportional to the net pinning moment, the exchange coupling is increased.

A transfer curve (a plot of the readback signal of the spin valve head versus the applied signal from the magnetic disk) of a spin valve sensor is defined by $\sin \theta$. A substantially flat portion of the transfer curve is selected for location of a bias point so that response of the sensor is substantially linear. Since positive and negative magnetic fields from a moving magnetic disk are typically equal in magnitude, it is important that positive and negative changes in the magnetoresistance of the spin valve sensor about the bias point on the transfer curve also be equal, which is referred to herein as read signal symmetry. The location of the bias point on the transfer curve is influenced by various magnetic fields when the sensor is in a quiescent state (sense current conducted, but an absence of magnetic fields from the rotating disk). When these magnetic fields are not balanced there will be read signal asymmetry in a positive or a negative direction with respect to the bias point.

A high performance spin valve head has high magnitude read signal output, and low, or no, read signal asymmetry. Where there is no read signal asymmetry, the transfer curve of the read signal is centered about a zero bias point. This means that from a point where the input signal is zero, the amplitudes of the positive and negative read signal outputs are equal as the input signals go between positive to negative levels. The level of performance of the spin valve head is dependent upon proper orientation and magnetizations of the aforementioned layers. If either of the pinned or biasing layers acquires a multi-magnetic domain state, read signal output will be decreased and read signal asymmetry will be increased. The impact on read signal output and read signal asymmetry will be even greater if the magnetic spins of the pinning layer are disoriented.

After fabrication of rows and columns of magnetic heads at a wafer level, the orientation of the magnetic spins of the pinning layers and the magnetic moments of the pinned and biasing layers are set by the application of magnetic fields in the presence of heat at or above the blocking temperature of the pinning layers. After setting the layers the heads typically undergo testing at the wafer level. The testing may be implemented by connecting test circuitry to terminals that are connected to the heads. The wafer is then diced into rows of sliders which contain the magnetic heads and then the row is lapped for forming the air bearing surfaces of the sliders. Unfortunately, after testing at the wafer level, dicing the heads into rows and lapping, the pinned and biasing layers may be changed from a single magnetic domain state to a multi magnetic domain state. In some heads, the orientation of the spins of the pinning layer may also be disturbed. Either or both of these conditions will cause a decrease in the performance of the spin valve head.

SUMMARY OF THE INVENTION

In order to return the spin valve heads to an acceptable level of performance at the row level, the magnetic moments of the pinned and biasing layers, and the orientation of the spins of the pinning layer should be reset. A scheme investigated by us for resetting the spin valve heads at the row level applies a first field perpendicular to the air bearing surfaces of the heads in the presence of heat for resetting the pinning and pinned layers, and then applies a second field parallel to the air bearing surfaces for resetting the biasing layers. The heat is applied exteriorly to the row of magnetic heads for the purpose of raising the temperature of the pinning layers to or above its blocking temperature. When this procedure was applied to 528 low amplitude spin valve heads at the row level, it resulted in recovery of 410 heads, which is a 77% yield. Unfortunately, the heating caused what is known in the art as "protrusion". After fabrication of the spin valve head, an overcoat layer, which is typically alumina, is deposited on top of the multiple layers. Many of the layers, including the overcoat layer, have an edge that forms a portion of the ABS. When exterior heat is applied the row of sliders and all layers of the heads, including the insulation stacks of the write heads, are heated to, or above, the blocking temperature. The insulation stack is, typically, baked photoresist, which has a greater coefficient of expansion than the remainder of the head. The greater expansion of the insulation stack pushes against the overcoat layer, forcing the edge of the overcoat layer beyond the edges of the other layers and causing the overcoat layer to protrude beyond the ABS. This condition seriously affects the fly height of the head above the rotating magnetic disk, and can cause damage to the rotating disk if the protruding edge of the overcoat layer contacts the disk.

We have discovered that, by omitting the heating step, we can significantly improve the manufacturing yield. In our method we applied the first magnetic field at room temperature for resetting the pinned layer perpendicular to the ABS. No external heat was applied as required by the prior art method. It should be noted that our procedure will not reset the pinning layer, since heat is required for this step. Next, we applied the second magnetic field for resetting the biasing layer parallel to the ABS. This new method was applied to 528 spin valve heads at the row level, resulting in a recovery of 472 heads—an 89% yield. Accordingly, this new resetting procedure resulted in a 12% improvement in yield over the prior resetting procedure, even though there was no recovery of spin valve heads where the magnetic spins of the pinning layers were disoriented. About 2% of the low amplitude heads did not recover because of inoperable pinning layers. However, we have discovered a second resetting procedure for recovering heads that have inoperable pinning layers.

In our second resetting method, localized heat is applied to the pinning layer to raise its temperature to or above its blocking temperature before the first magnetic field is applied. We obtain this heat by applying a current pulse of short duration to the spin valve sensors of a row through the read terminals. This heating process is localized to the pinning layers, and does not heat the insulation stacks in the write heads. Accordingly, there is no protrusion of the overcoat layer beyond the ABS. During the current pulse, we apply the first magnetic field for resetting the pinning and pinned layers. We then apply the second magnetic field for resetting the biasing layers. With this second resetting method, the aforementioned 2% heads with inoperable pinning layers were recovered, thereby further increasing the yield.

An object of the present method is to improve the yield of spin valve heads at the row level of magnetic head fabrication.

Another object is to provide a first method for improving the yield of spin valve heads at the row level, without a heating step.

A further object is to provide a second method for improving the yield of spin valve heads at the row level by applying localized heating.

Still another object is to reset pinning layers of spin valve heads at the row level by applying a short duration current pulse to each spin valve head for localized heating of the pinning layer and simultaneously applying a magnetic field perpendicular to an ABS of the head.

Other objects and attendant advantages of the invention will become apparent upon reading the following description taken together with the accompanying drawings.

BRIEF DESCRIPTION OF THE DRAWINGS

FIG. 9 is an ABS view of a single film pinned layer spin valve sensor;

FIG. 10 is view along plane X—X of FIG. 9 rotated 90°;

FIG. 11 is an ABS view of an AP pinned spin valve sensor;

FIG. 12 is a view taken along plane XII—XII of FIG. 11 rotated 90°;

FIG. 15 is an enlarged row of magnetic heads after the row has been cut from the wafer of FIG. 14 and lapped to form an ABS;

FIG. 16 is a transfer curve for a spin valve sensor that demonstrates read signal symmetry;

FIG. 17 is a transfer curve for a spin valve sensor that demonstrates positive read signal asymmetry;

FIG. 18 is a transfer curve for a spin valve sensor that demonstrates negative read signal asymmetry;

DESCRIPTION OF THE PREFERRED EMBODIMENTS

Magnetic Disk Drive

Figure 1:
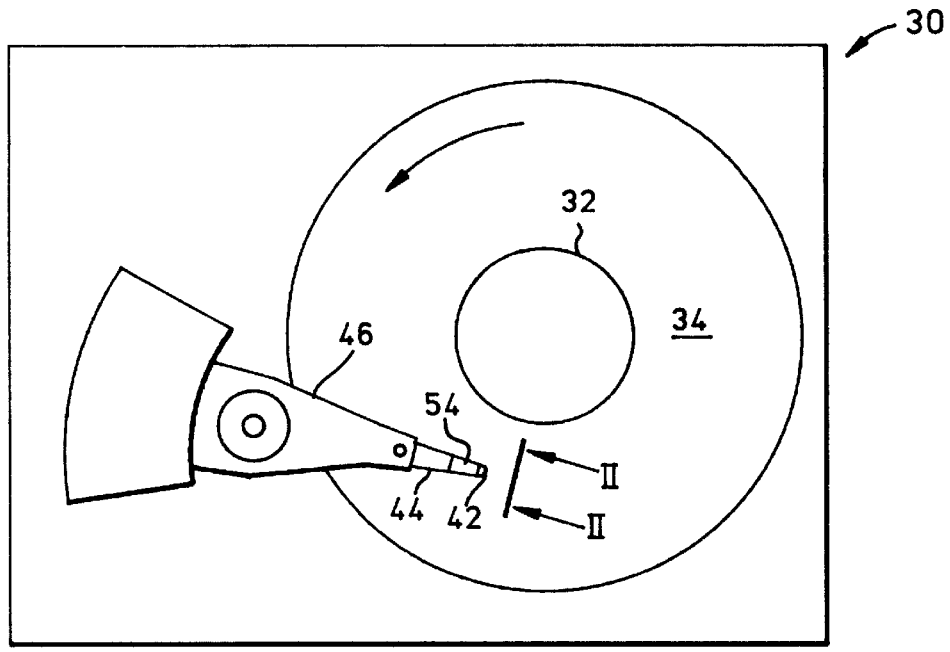
FIG. 1 is a planar view of an exemplary magnetic disk drive.
Figure 2:
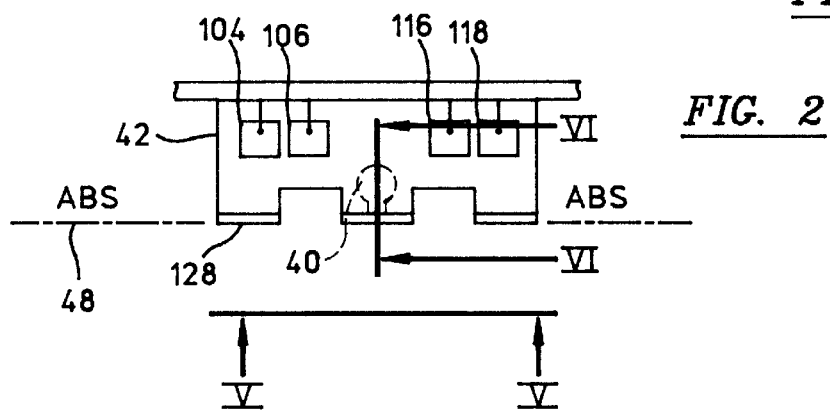
FIG. 2 is an end view of a slider with a magnetic head as seen in plane II—II.
Figure 3:
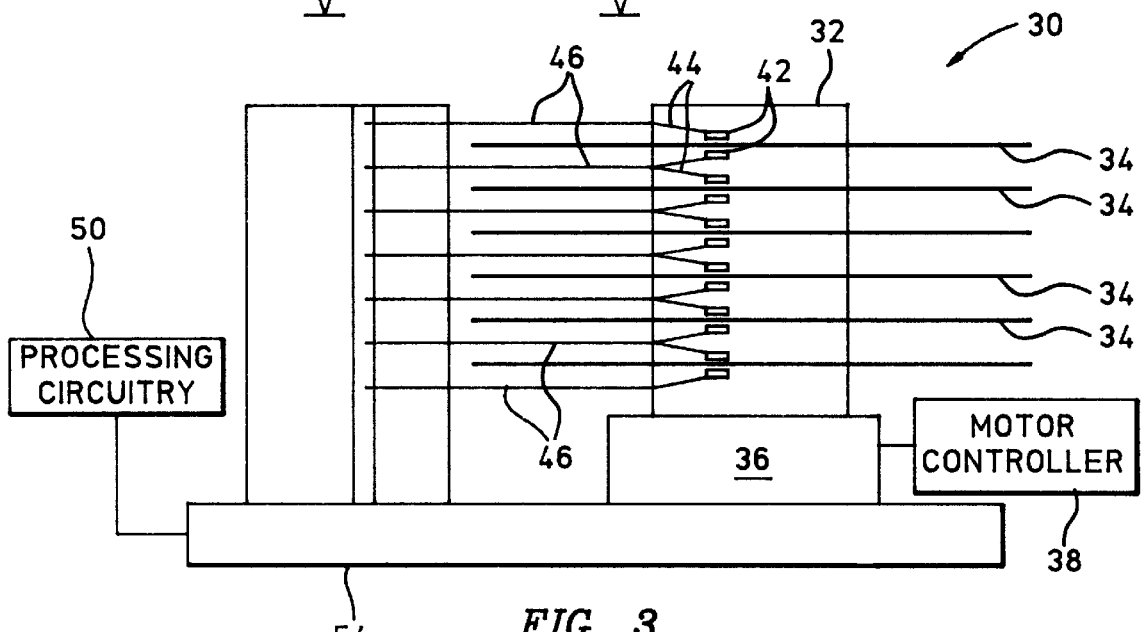
FIG. 3 is an elevation view of the magnetic disk drive wherein multiple disks and magnetic heads are employed.
Figure 4:
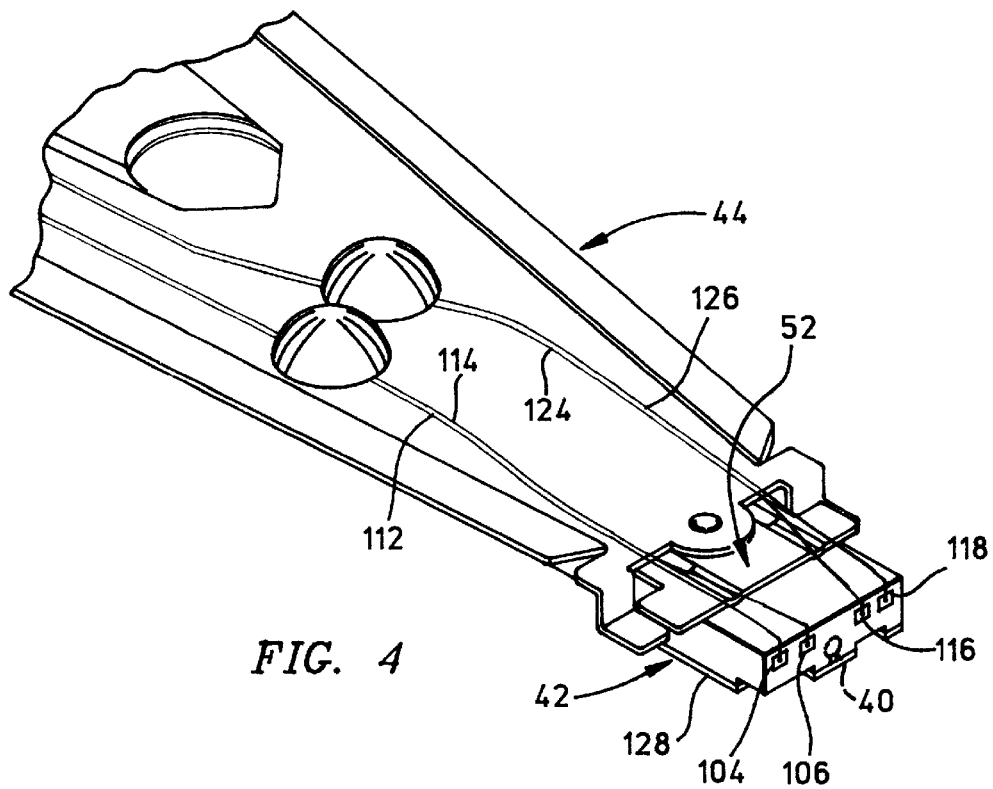
FIG. 4 is an isometric illustration of an exemplary suspension system for supporting the slider and magnetic head.

Referring now to the drawings, where like reference numerals designate like or similar parts throughout the several views, FIGS. 1–3 illustrate a magnetic ("hard") disk drive 30. The drive 30 includes a spindle 32 that supports and rotates a magnetic disk 34. The spindle 32 is rotated by a motor 36 that is controlled by a motor controller 38. A combined read and write magnetic head 40 is mounted on a slider 42 that is supported by a suspension 44 and actuator arm 46. A plurality of disks, sliders and suspensions may be employed in a large capacity direct access storage device (DASD) as shown in FIG. 3. The suspension 44 and actuator arm 46 position the slider 42 so that the magnetic head 40 is in a transducing relationship with a surface of the magnetic disk 34. When the disk 34 is rotated by the motor 36 the slider is supported on a thin (typically, 0.05 $\mu$m) cushion of air (air bearing) between the surface of the disk 34 and the air bearing surface (ABS) 48. The magnetic head 40 may then be employed for writing information signals to multiple circular tracks (not shown) on the surface of the disk 34, as well as for reading information signals therefrom. Processing circuitry 50 exchanges information signals with the head 40, provides motor drive signals for rotating the magnetic disk 34, and provides control signals for moving the slider to various tracks. In FIG. 4 the slider 42 is shown mounted to a head gimbal assembly (HGA) 52 which, in turn, is mounted to the suspension 44. The components described hereinabove may be mounted on a frame 54, as shown in FIG. 3.

Figure 5:
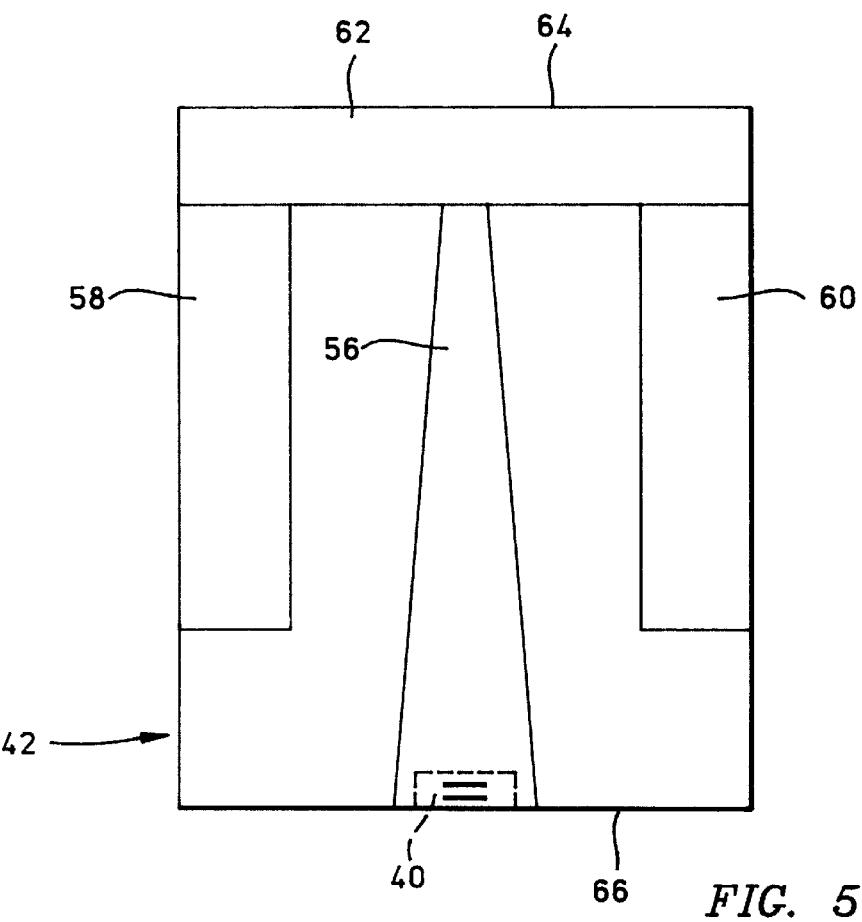
FIG. 5 is an ABS view of the magnetic head taken along in plane V—V of FIG. 2.

FIG. 5 is an ABS view of the slider 42 and the magnetic head 40. The slider may have a center rail 56 that supports the magnetic head 40, and side rails 58 and 60. The rails 56, 58 and 60 extend from a cross rail 62. With respect to the direction of rotation of the magnetic disk 34, the cross rail 62 is at a leading edge 64 of the slider and the magnetic head 40 is at a trailing edge 66 of the slider.

Figure 6:
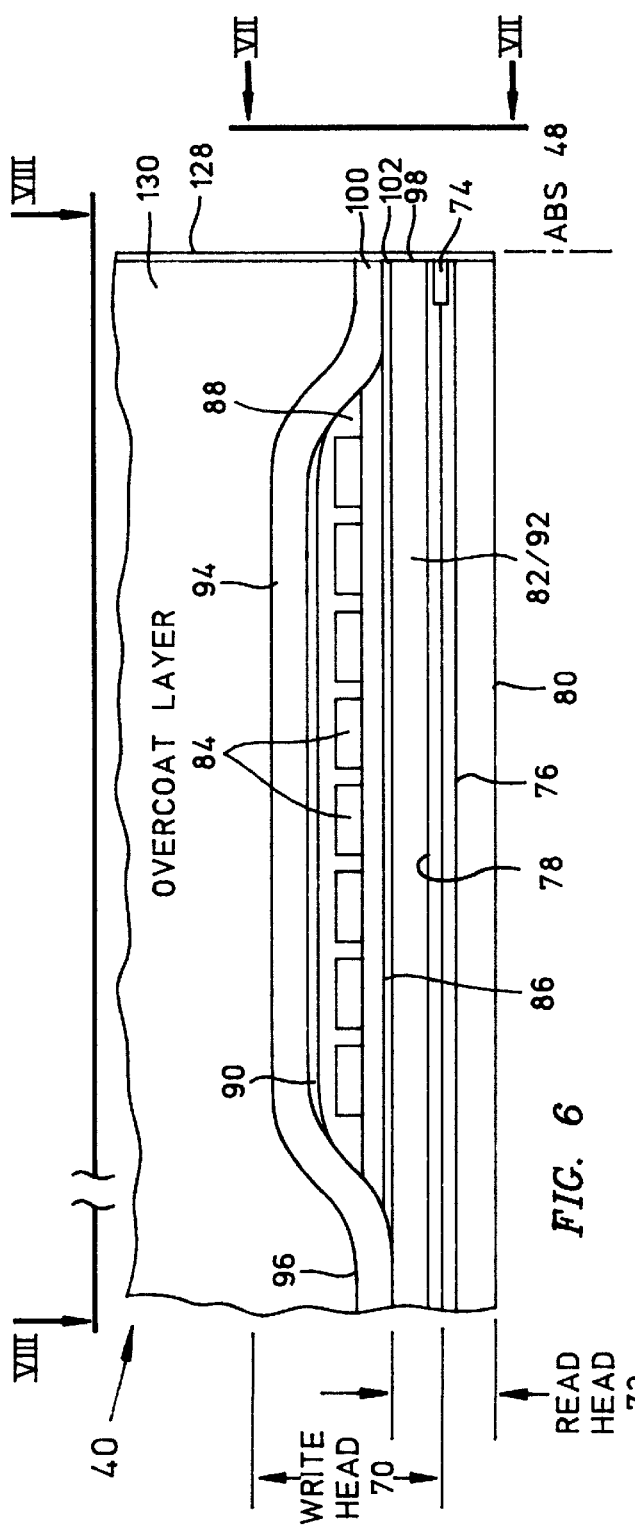
FIG. 6 is a partial view of the slider and magnetic head as seen in plane VI—VI of FIG. 2.
Figure 7:
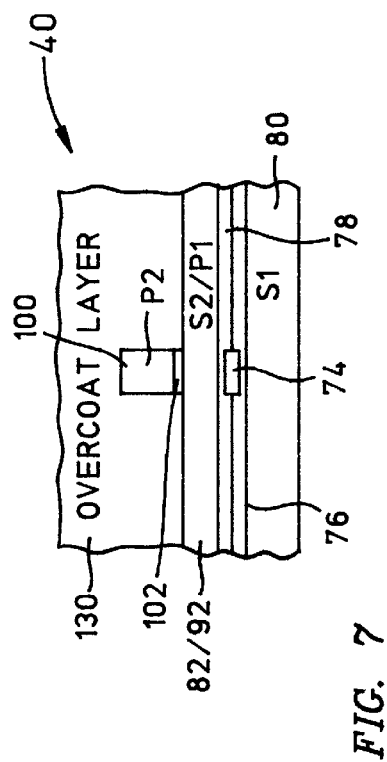
FIG. 7 is a partial ABS view of the slider taken along plane VII—VII of FIG. 6 to show the read and write elements of the magnetic head.

FIG. 6 is a side cross-sectional elevation view of the merged MR head 40, which includes a write head portion 70 and a read head portion 72, the read head portion employing an AP pinned spin valve sensor 74 of the present invention. FIG. 7 is an ABS view of FIG. 6. The spin valve sensor 74 is sandwiched between first and second gap layers 76 and 78, and the gap layers are sandwiched between first and second shield layers 80 and 82. In response to external magnetic fields (information signals), the resistance of the spin valve sensor 74 changes. A sense current $I_S$ conducted through the sensor causes these resistance changes to be manifested as potential changes. These potential changes are then processed as readback signals by the processing circuitry 50 shown in FIG. 3.

Figure 8:
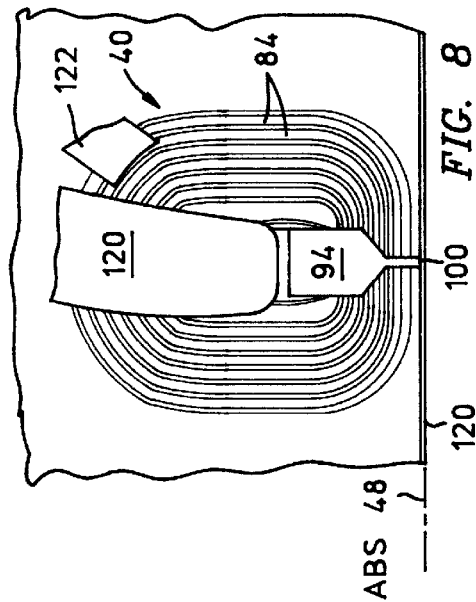
FIG. 8 is a view taken along plane VIII—VIII of FIG. 6 with all material above the write coil removed except for write coil leads of the second pole piece.

The write head portion of the merged MR head includes a coil layer 84 sandwiched between first and second insulation layers 86 and 88. A third insulation layer 90 may be employed for planarizing the head to eliminate ripples in the second insulation layer caused by the coil layer 84. The first, second and third insulation layers are referred to in the art as an "insulation stack". The coil layer 84 and the first, second and third insulation layers 86, 88 and 90 are sandwiched between first and second pole piece layers 92 and 94. The first and second pole piece layers 92 and 94 are magnetically coupled at a back gap 96 and have first and second pole tips 98 and 100 which are separated by a write gap layer 102 at the ABS. As shown in FIGS. 2 and 4, first and second solder connections 104 and 106 connect leads from the spin valve sensor 74 to leads 112 and 114 on the suspension 44, and third and fourth solder connections 116 and 118 connect leads 120 and 122 from the coil 84 (see FIG. 8) to leads 124 and 126 on the suspension. A wear layer 128 may be employed for protecting sensitive elements of the magnetic head, as shown in FIGS. 2, 4, 6 and 7. An overcoat layer 130 of alumina ($Al_2O_3$) covers the aforementioned layers of the head.

Single Film Pinned Layer Spin Valve Sensor

FIG. 9 is an ABS view of a single film pinned layer spin valve sensor 200. The spin valve sensor 200 includes a non-magnetic electrically conductive spacer layer 204 sandwiched between a ferromagnetic free layer 206 and a ferromagnetic pinned layer 208. An antiferromagnetic (AFM) pinning layer 210 interfacially engages the pinned layer 208. The pinning layer has its magnetic spins oriented out of the drawing which, by exchange coupling, cause the magnetic moment 212 of the pinned layer to be directed out of the drawing and toward the ABS. Optionally, the magnetic spins of the pinning layer 210 may be oriented into the paper. The free layer 206 has a magnetic moment 214 directed generally parallel to the ABS. The free layer 206 is typically capped with an electrically conductive capping layer 215, such as tantalum. Hard biasing layers 216 and 218 are exchange coupled to opposite end portions of the free layer 206 for stabilizing the free layer 206 in a single domain state. Electrically conductive leads 219 and 220 are electrically connected to opposite end portions of the sensor 200, the distance between the connections of the leads to the sensor defining the track width of the sensor. In a magnetic disk drive, as shown in FIG. 3, processing circuitry 50 applies a sense current $I_S$ through the sensor from left to right, as shown in FIG. 9. When the sensor 200 is subjected to magnetic fields from a rotating magnetic disk, the fields rotate the moment 214 of the free layer causing its angular position with respect to the fixed (pinned) moment 212 of the pinned layer to change upwardly and downwardly, depending upon the polarity of the field signals from a rotating magnetic disk. This causes corresponding resistance changes in the sensor which, in turn, causes potential changes across the sensor which are detected by a sensing circuit in the processing circuitry 50 as readback signals.

Before a magnetic head is mounted on the suspension and connected to the ESD protection circuits (not shown), the sensor 200 of the head may have been subjected to an ESD that disorients the magnetic spins of the antiferromagnetic layer 210 and destabilizes a single domain state of the pinned and biasing layers 208, 216 and 218. This may not be known until the magnetic head has been installed on the suspension and the suspension installed in the magnetic disk drive. This equates to a significant amount of costly labor. Without some scheme for resetting the layers, a magnetic disk drive may become unmarketable.

AP Pinned Spin Valve Sensor

The sensor 300 shown in FIGS. 11 and 12 is an antiparallel (AP) pinned spin valve sensor. The sensor 300 has a ferromagnetic free layer 310, an antiparallel pinned ferromagnetic layer 312, and a nonmagnetic electrically conductive spacer layer 314. The spacer layer 314 is sandwiched between the free layer 310 and the pinned layer 312. The AP pinned layer 312 differs from the typical spin valve sensor, which employs a single film pinned layer, in that the AP pinned layer 312 employs first and second ferromagnetic films 316 and 318 which are separated by a nonmagnetic electrically conductive spacer film 320, which is referred to hereinafter as an antiparallel pinned (AP) coupling film 320. The first film 316 has a surface which interfaces with a surface of an antiferromagnetic pinning layer 322 so that the pinning layer pins the magnetic moment 324 of the first film by exchange coupling in a pinned direction perpendicular to and away from or toward the ABS. The AP coupling film 320 is very thin, in the order of 8 Å, which allows an antiferromagnetic exchange coupling between the first and second films 316 and 318. Accordingly, the magnetic moment 326 of the second film is directed in a direction opposite to the magnetic moment 324 of the first film 316, namely perpendicular to and toward the ABS. The thicker of the two films 316 and 318 determines the net magnetic moment of the AP pinned layer 312. The first film 316 has been selected to be the thicker of the two films so that the net magnetic moment is directed perpendicular to and away from the ABS. A capping layer 327 may cover the free layer 310.

The free layer 310 has a magnetic moment 328 which is free to rotate in first and second directions under the influence of field signals (flux incursions) from the rotating disk 34. These field signals are positive and negative going signals, typically of equal magnitude. First and second hard bias layers 330 and 332 are exchange coupled to end portions of the free layer 310 for stabilizing the free layer in a single domain state. First and second leads 334 and 336 are electrically connected to end portions of the sensor 300 with a space therebetween which defines the active region of the sensor as well as the trackwidth of the read head employing the sensor. In a magnetic disk drive, as shown in FIG. 3, processing circuitry 50 applies a sense current $I_S$ through the sensor as shown by the arrows in FIG. 11. A sensing circuit 332, which is part of the processing circuitry 50, senses potential changes across the sensor 300 when field signals are induced in the sensor by the rotating disk 34 shown in FIG. 2.

Each of the layers 310, 314, 316, 318 and 320 conducts a portion of the sense current between the first and second leads 334 and 336. As discussed hereinabove, an aspect of the spin valve sensor is limiting the spacer layer 314 to a thickness less than the mean free path of conduction electrons flowing in the free and pinned layers 310 and 312. The degree of electron scattering, which depends upon the relative angle between the magnetization 328 of the free layer 310 and the magnetization 326 of the second film 318, determines the resistance of the sensor to the sense current $I_S$. The greatest scattering and the correspondingly greatest increase in resistance occurs when the magnetization 328 of the free layer and the magnetization 326 of the AP pinned layer are antiparallel, and the least scattering and the correspondingly least resistance change occurs when the magnetization 328 of the free layer and the magnetization 326 of the AP pinned layer are parallel with respect to one another.

The magnetization 328 of the free layer 310 is typically oriented substantially parallel to the ABS so that, upon receiving positive and negative field signals from a rotating disk, the magnetization 328 rotates upwardly or downwardly to decrease or increase the resistance of the sensor. The opposite effect would be produced if the magnetization of the second film 318 was oriented away from the ABS instead of toward the ABS. When the sense current is directed, as shown in FIGS. 11 and 12, the bias point will be shifted relative to the transfer curve. This is caused by various magnetic influences on the free layer 310.

When the pinning, pinned and biasing layers of either the single pinned sensor 200, shown in FIG. 9, or the AP pinned sensor 300, shown in FIG. 11, are destabilized during construction and/or processing signal amplitude of the head is decreased and read signal asymmetry is increased, as discussed in more detail hereinafter.

Figure 13:
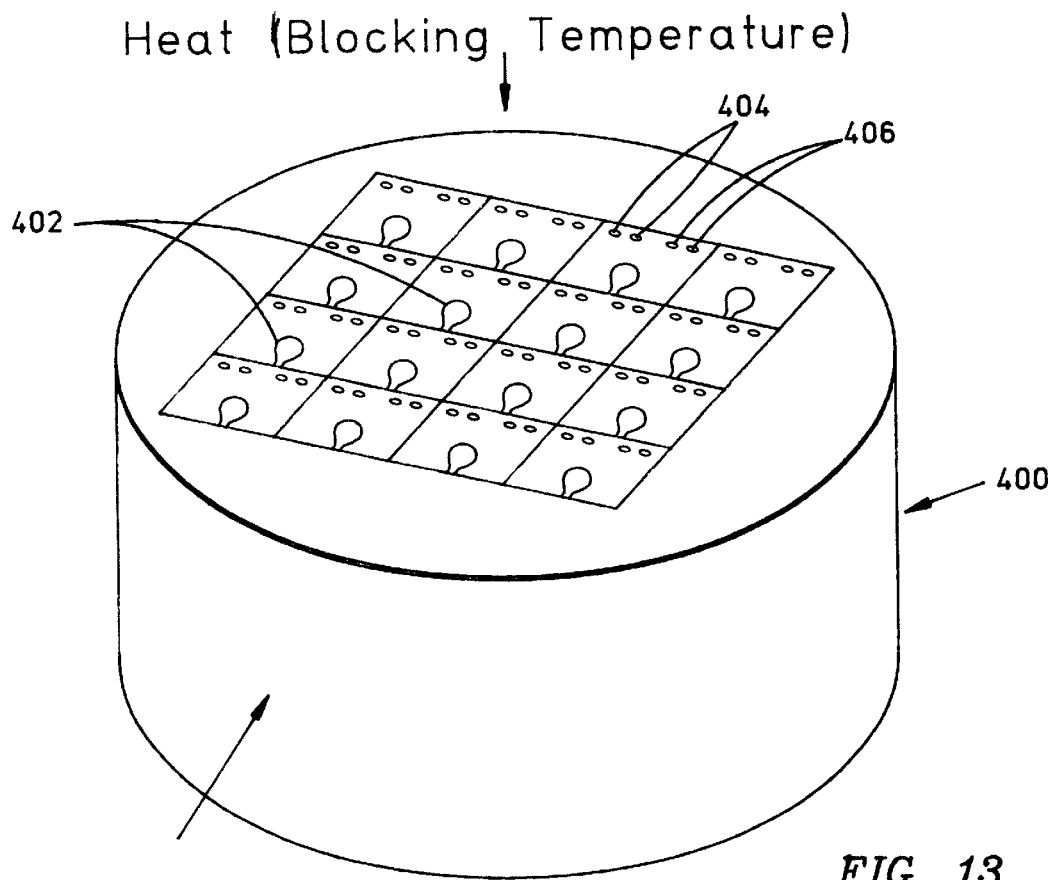
FIG. 13 is an isometric illustration of a wafer with rows and columns of spin valve heads thereon with a first field and heat being applied for setting magnetic properties of a pinning and pinned layer in each of the heads.
Figure 14:
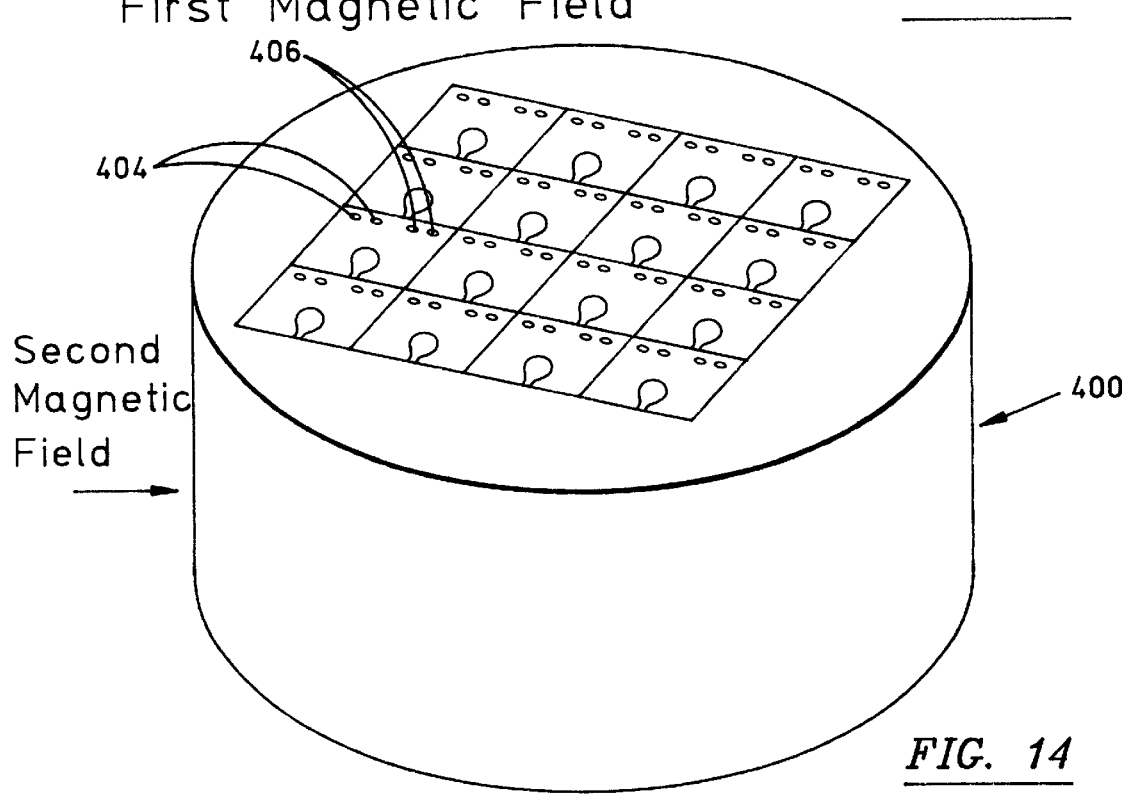
FIG. 14 is the same as FIG. 13 except a second field is being applied for setting magnetic properties of biasing layers within each of the heads.

FIG. 13 shows a wafer substrate 400 upon which there has been constructed a plurality of magnetic heads 402 which are arranged in rows and columns. The read head portion of each magnetic head employs either the single pinned film spin valve sensor, as shown in FIGS. 9 and 10, or the AP pinned spin valve sensor, as shown in FIGS. 11 and 12. At the wafer level, heat is applied at or above the blocking temperature of the pinning layer of the spin valve sensor, so that the magnetic spins of the pinning layer can be easily oriented. During the heat cycle, a first magnetic field is applied perpendicular to the ABS sites of the magnetic heads for orienting the spins of the pinning layer perpendicular to the ABS. The first magnetic field will also set the magnetic moment of the pinned layer of the spin valve sensor to be substantially perpendicular to the ABS in a single domain state. In FIG. 14 a second magnetic field is applied parallel to the ABS sites for setting the magnetic moments of the biasing layers to be substantially parallel to the ABS in a single domain state. As shown in FIGS. 13 and 14, each of the magnetic heads is provided with a pair of read terminals 404 and a pair of write terminals 406. These terminals are connected to test circuitry (not shown) for testing the various components of the head. After testing, the wafer is cut into rows of magnetic heads, one of these rows 408 being illustrated in FIG. 15. The row is lapped to form an ABS at 410. After testing, cutting the wafer into rows of heads and lapping, we have found that the output signals of the heads and the read signal asymmetry have been increased, thereby reducing the manufacturing yield. This is due primarily to the change of the pinned and biasing layers from a single magnetic domain state to a multi-magnetic domain state. In some instances, the testing, cutting and lapping disorients the magnetic spins of the pinning layer.

Destabilization of the pinning, pinned and biasing layers can affect read signal asymmetry, as stated hereinabove. A desired read signal symmetry is shown in FIG. 16, where the bias point is located midway on the transfer curve of the spin valve sensor. Undesirable read signal asymmetries are illustrated in FIGS. 17 and 18. FIG. 17 shows a positive read signal asymmetry and FIG. 18 shows a negative read signal asymmetry. Read signal asymmetries, as shown in FIGS. 17 and 18, are unacceptable and reduce the manufacturing yield.

Figure 19:
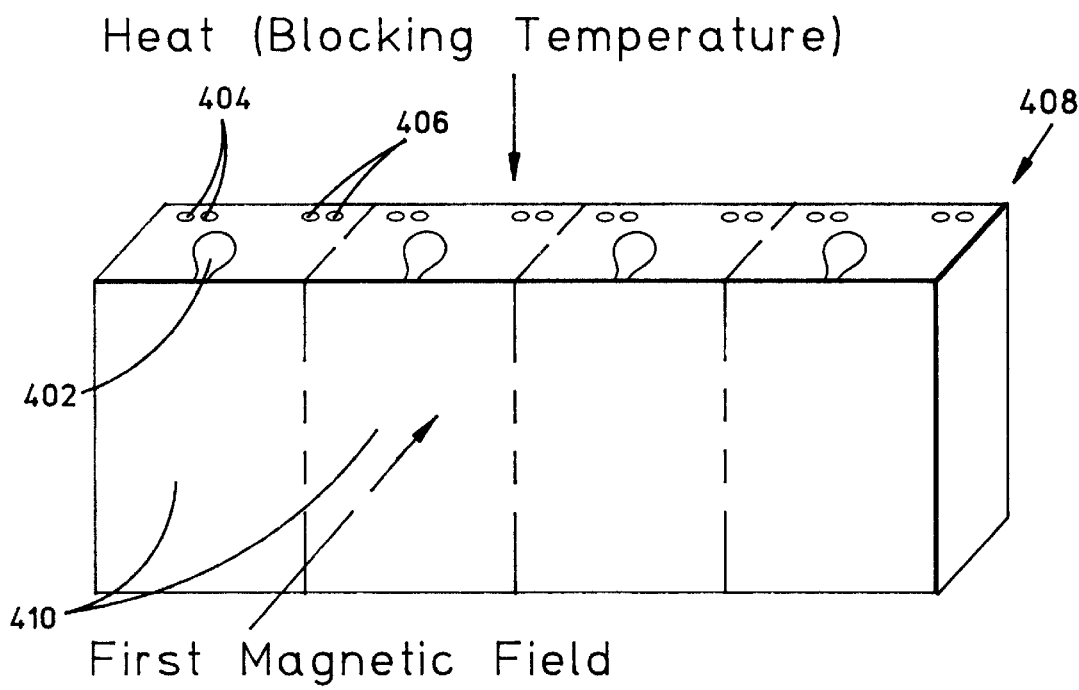
FIG. 19 is an isometric illustration of the row of spin valve heads of FIG. 15 wherein a first field and heat are applied for resetting magnetic properties of pinning and pinned layers of each head.
Figure 20:
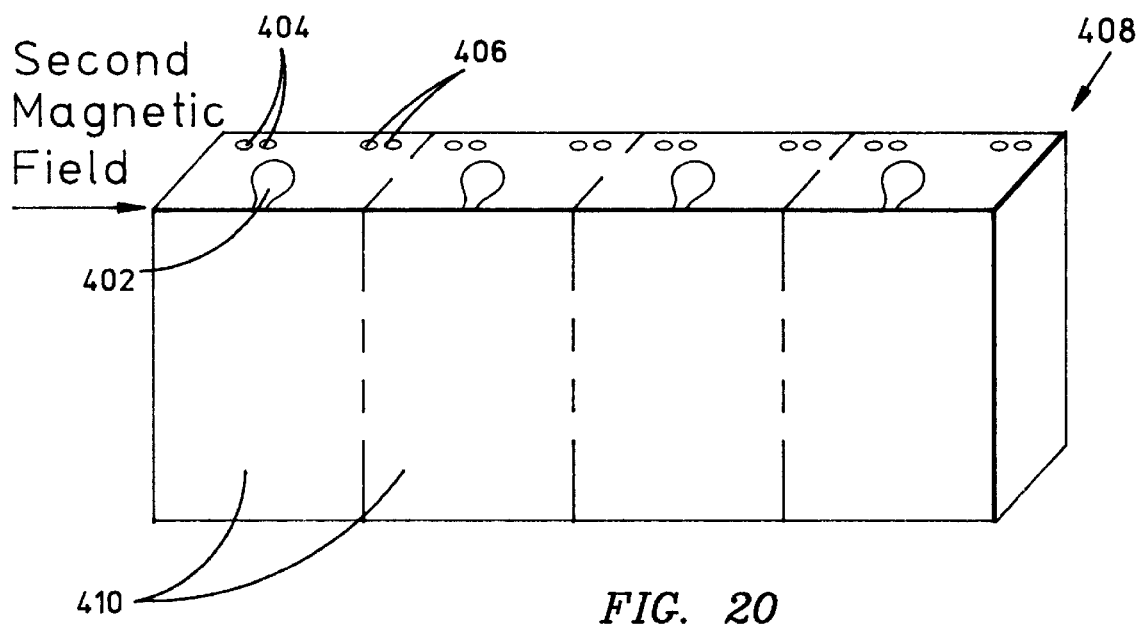
FIG. 20 is the same as FIG. 15 except a second field is being applied for resetting magnetic properties of biasing layers of each head.

In order to improve the yield and reduce read signal asymmetry, we have investigated applying heat to the row of heads 408 at or above the blocking temperature of the pinning layer, as shown in FIG. 19. During the heating cycle, a first magnetic field is applied perpendicular to the ABS sites for orienting the magnetic spins of the pinning layer substantially perpendicular to the ABS sites, and for resetting the magnetic moment of the pinned layer substantially perpendicular to the ABS sites in a single domain state. Next, a second magnetic field is applied parallel to the ABS sites, as shown in FIG. 20, for resetting the magnetic moments of the biasing layers parallel to the ABS.

Figure 21:
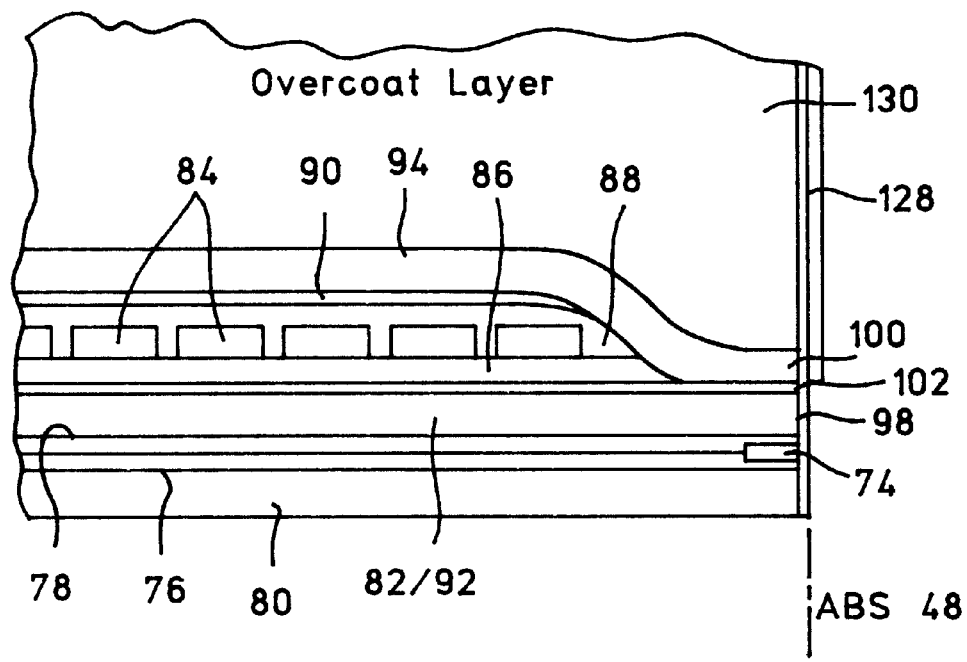
FIG. 21 shows the front portion of FIG. 6 wherein heat has caused the insulation stack of the write head to push on the overcoat layer causing it to protrude beyond the ABS.
Figure 22:
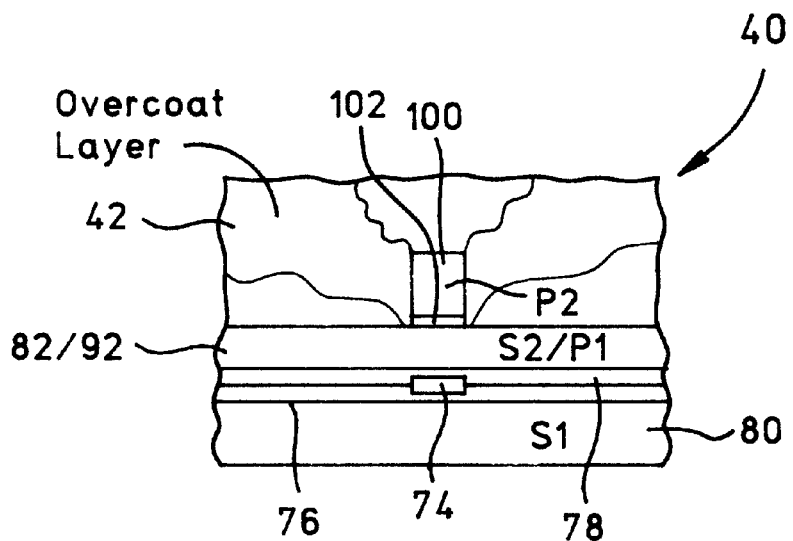
FIG. 22 is an ABS view taken along plane XXII—XXII of FIG. 21 showing cracks caused by the protrusion of the overcoat layer beyond the ABS as shown in FIG. 17.

Unfortunately, the heating cycle in FIG. 19 typically results in protrusion of the overcoat layer 130 beyond the ABS, as shown in FIG. 21. Since the insulation stack, comprising the layers 86, 88 and 90, has a coefficient of expansion that is greater than the other components in the head, it expands and pushes the overcoat layer 130 forward, which also results in cracking of the overcoat layer, as shown in FIG. 21. Protrusion of the overcoat layer is unacceptable because it alters the fly height of the magnetic head over the rotating magnetic disk and can damage the disk upon contact.

The Invention

Figure 23:
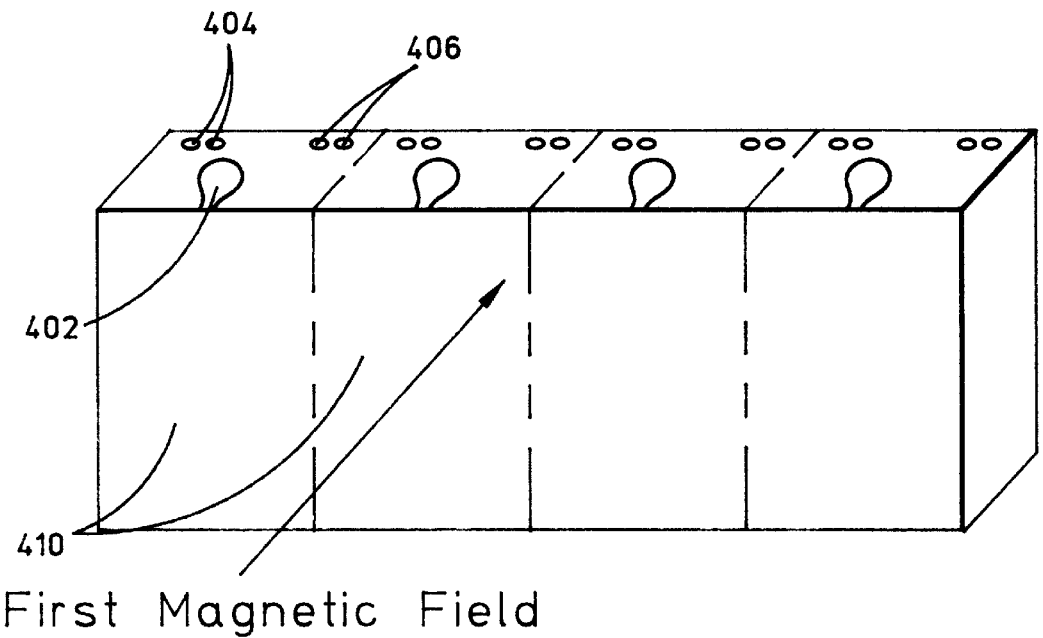
FIG. 23 is an isometric illustration of a row of spin valve heads wherein a first field of the present invention is applied for resetting the pinned layer of each head.
Figure 24:
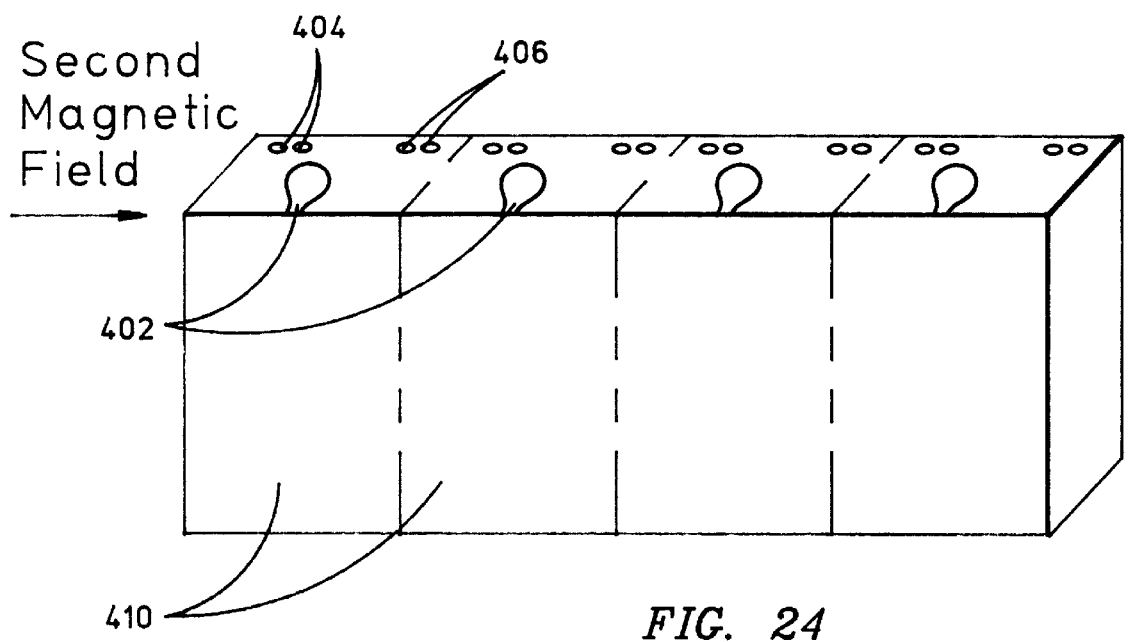
FIG. 24 is the same as FIG. 23 except a second field of the present method is employed for resetting the magnetism of the biasing layers of each head.

FIGS. 23 and 24 illustrate a first embodiment of the invention, wherein the layers of the spin valve sensor are reset without the protrusion problem illustrated in FIG. 21. In the first embodiment, a first magnetic field is applied perpendicular to the ABS of the magnetic heads at the row level at a temperature below the blocking temperature of the pinning layer (210 in FIG. 9 or 322 in FIG. 11), such as at room temperature. The blocking temperature depends upon the material employed for the pinning layer. Typical pinning layer materials are NiMn, PtMn or FeMn which have blocking temperatures of 270° C., 300° C. and 160° C., respectively. It should be noted that this method differs from the method shown in FIG. 19 in that no external heat is applied to the row of magnetic heads. This overcomes the protrusion problem shown in FIG. 21. The first magnetic field will reset the pinned layer with its magnetic moment oriented to be substantially perpendicular to the ABS in a single domain state. If the magnetic spins of the pinning layer are disoriented, this first step of the first embodiment will not reset the pinning layer since the pinning layer has not been elevated to or above its blocking temperature. However, we have discovered that only about 2% of the heads failed to perform because of disorientation of the magnetic spins of the pinning layer. Next, a second magnetic field is applied parallel to the ABS for resetting the magnetic moments of the biasing layers to be substantially parallel to the ABS in a single domain state, as shown in FIG. 24.

528 spin valve heads were reset by the method shown in FIGS. 19 and 20; the yield was 77%. In resetting the same number of spin valve heads by the first embodiment of the invention, as shown in FIGS. 23 and 24, the yield was 89%. Accordingly, our method, shown in FIGS. 23 and 24, had an increase in yield of 12% over the method of resetting, shown in FIGS. 19 and 20. In a preferred embodiment, the magnitude of the second magnetic field is less than the magnitude of the first magnetic field. The first magnetic field may have a magnitude of 5.0 kilogauss to 14.5 kilogauss, and the second magnetic field may have a magnitude from 2.5 kilogauss to 5.0 kilogauss. In the preferred embodiment, the first magnetic field is substantially 14.5 kilogauss, and the second magnetic field is substantially 4.5 kilogauss. The second magnetic field must be applied subsequent to application of the first magnetic field. Both of these magnetic fields may be applied by an electromagnet. The reason that the second magnetic field is less than the first magnetic field is because the first magnetic field must saturate the shield layers of the spin valve head before it can affect the layers of the spin valve sensor located between the shields.

Figure 25:
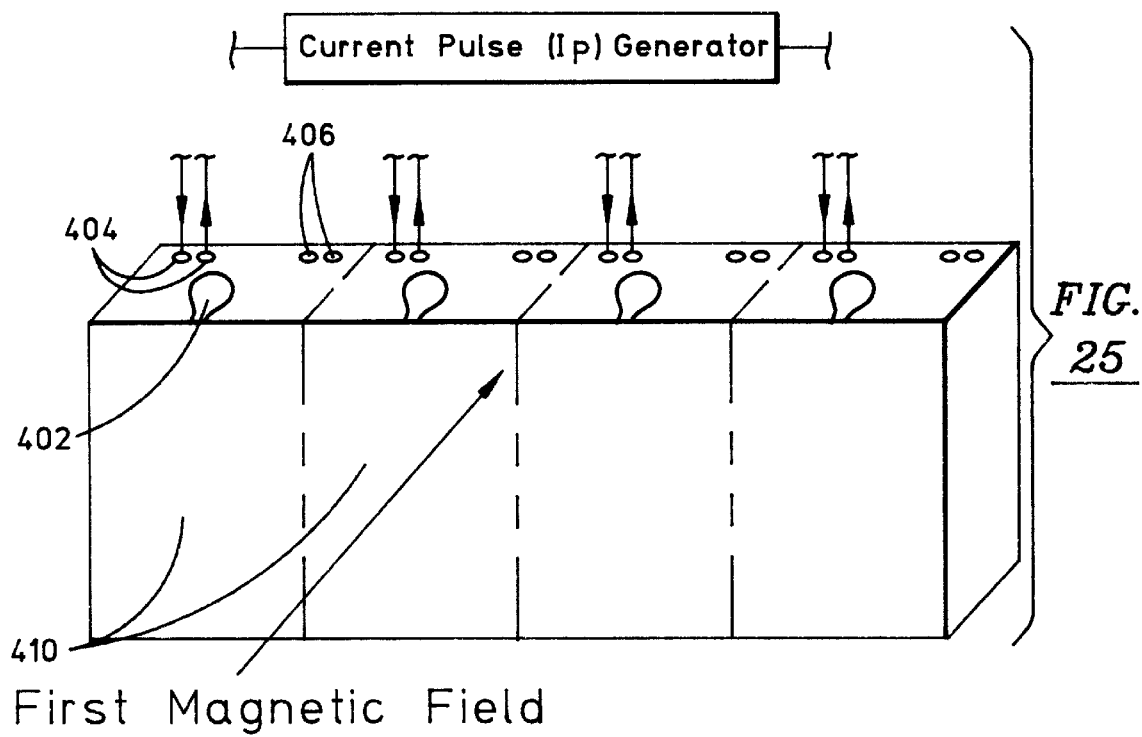
FIG. 25 is an isometric illustration of a row of spin valve heads wherein heat is applied internally within the head through the read terminals and a first field is applied for resetting the pinning and pinned layers of each spin valve head according to a second embodiment of the present invention.
Figure 26:
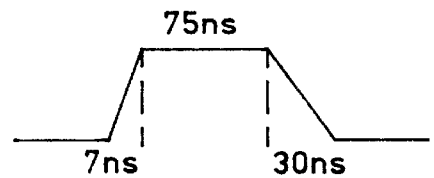
FIG. 26 is a graph showing an exemplary rise time, duration and decay time of a current pulse for heating the pinning layer.
Figure 27:
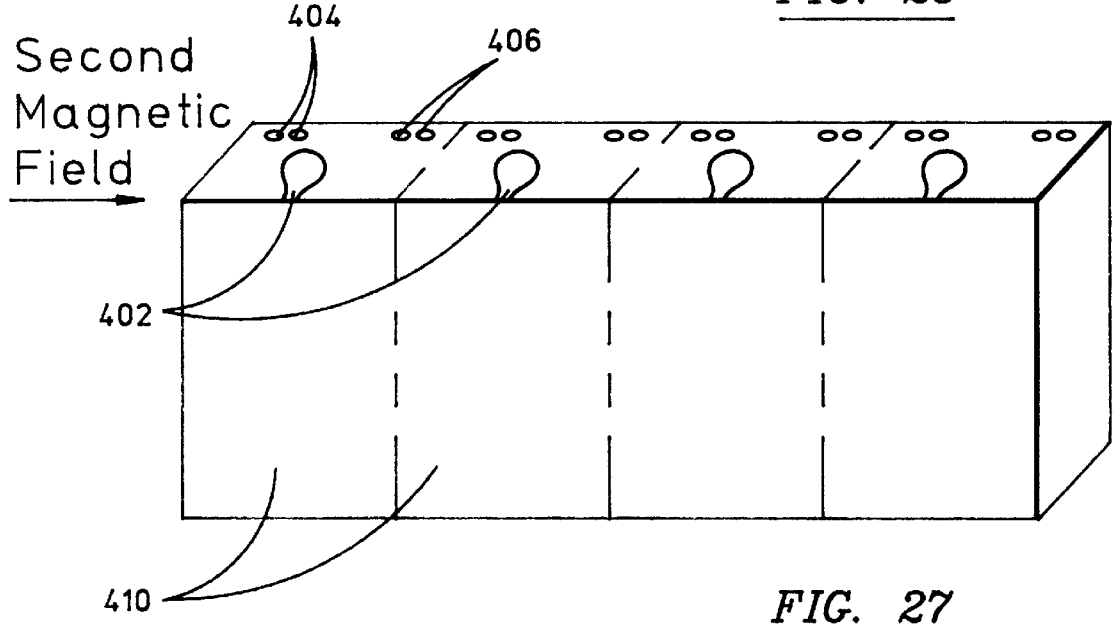
FIG. 27 is the same as FIG. 25 except a second field is applied for resetting the magnetism of the biasing layers of each head.

A second method of resetting the layers of the spin valve sensor according to the invention is shown in FIGS. 25–27. In FIG. 25 an enlarged row of heads is illustrated, with a pair of read head terminals 404, and a pair of write head terminals 406. The row of heads is lapped at a cut edge to form the air bearing surface 410 for each magnetic head. In the second method, heat is applied to the pinning layer of the spin valve sensor by applying a current pulse to each of the spin valve sensors via the pair of read terminals 404. The current pulse employed for heating the pinning layer will be conducted through the same circuit within each head that the sense current $I_S$ is conducted through. As shown in FIG. 26, the current pulse is of a very short duration so that there is no chance of heating the head to a level where the aforementioned protrusion of the overcoat layer occurs. The sense voltage is typically 0.3 volts. The preferred voltage pulse for heating the pinning layer is approximately twice the sense voltage, or 0.6 volts. The preferred duration at this level is approximately 75 nanoseconds, as shown in FIG. 26. In our experimentation the rise time was 7 nanoseconds and the decay time was 30 nanoseconds. The magnitude of the first magnetic field was 5 kilogauss. In the preferred embodiment, the voltage pulse applied at the read head terminals 404 is sufficient in level and duration to generate a current that heats the pinning layer at or above its blocking temperature, such as 200° C. A fixture (not shown) may be employed for applying a voltage pulse to each magnetic head simultaneously in a row of magnetic heads, or the voltage pulse may be applied sequentially to each magnetic head on a row of heads, as desired. The combination of the heating and application of the first magnetic field, shown in FIG. 25, will orient the magnetic spins of the pinning layer perpendicular to the ABS and reset the magnetic moment of the pinned layer to be substantially perpendicular to the ABS in a single domain state. The second step of the second embodiment is the same as the second step of the first embodiment. A second magnetic field is applied parallel to the ABS to reset the magnetic moment of the biasing layers to be substantially parallel to the ABS in a single domain state. The yield from the second embodiment of the invention, illustrated in FIGS. 25–27, will be greater than the yield obtained from the first embodiment shown in FIGS. 23 and 24, since the pinning layers will also be appropriately reset.

In a magnetic disk drive where the magnetic heads are mounted to the bottom and top of a suspension, as shown in FIG. 3, the first magnetic fields shown in FIGS. 23 and 25 will be applied in the directions shown in FIGS. 23 and 25 for the bottom head and in an opposite direction for the top head. After resetting the layers of the spin valve sensor at the row level, the row is diced into individual heads and mounted on a suspension, as shown in FIG. 4.

Examples

Figure 28:
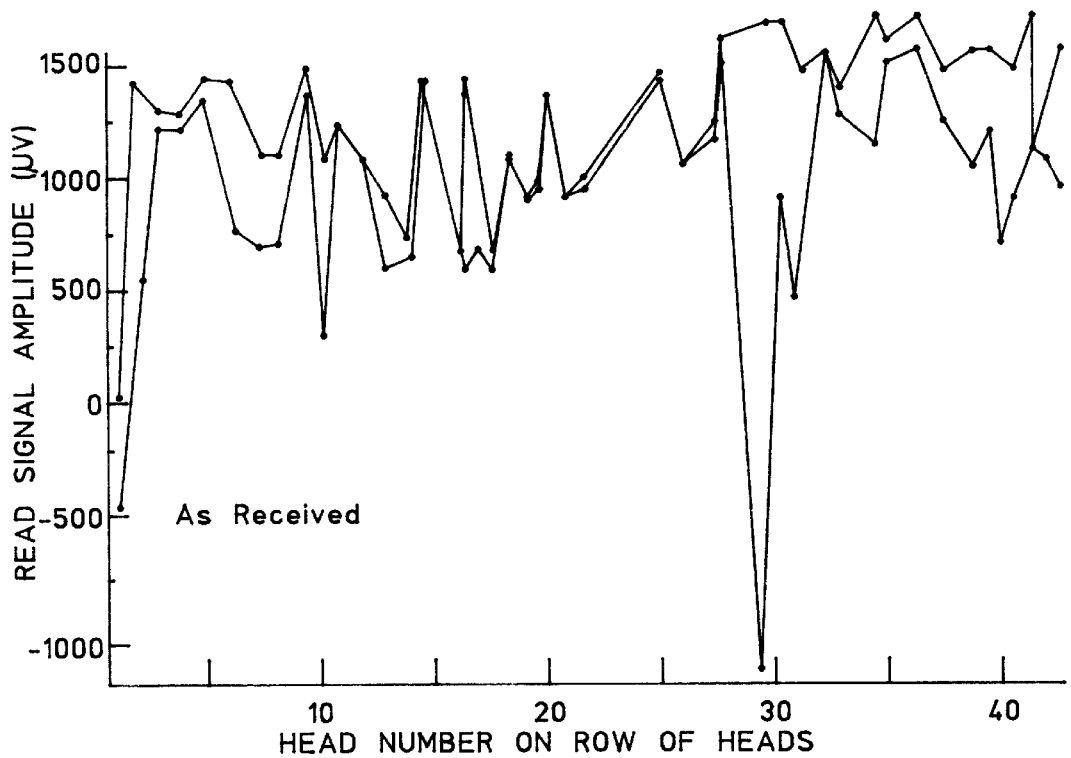
FIG. 28 is a graph illustrating a comparison between the signal outputs of 44 spin valve heads as received at the row level to signal outputs of the heads after resetting according to the first embodiment of the present invention.
Figure 29:
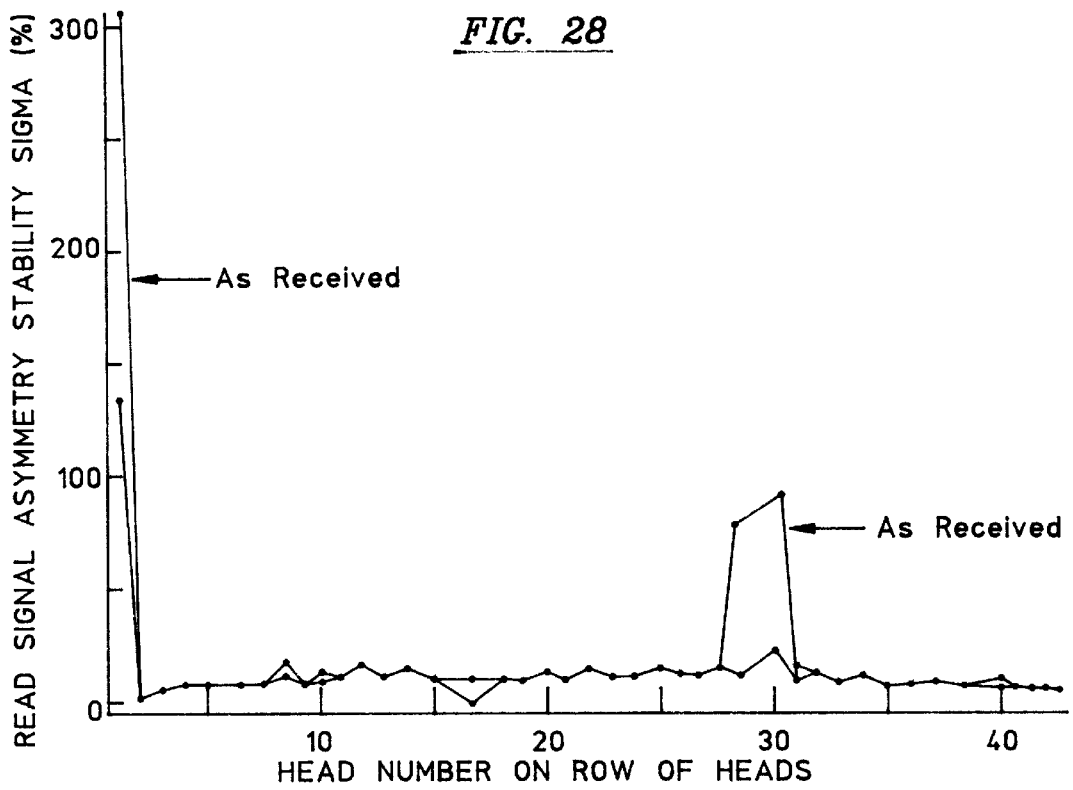
FIG. 29 is a graph illustrating a comparison between read signal asymmetry stability of 44 spin valve heads on a row before and after the heads are reset by the first embodiment of the present invention.
Figure 30:
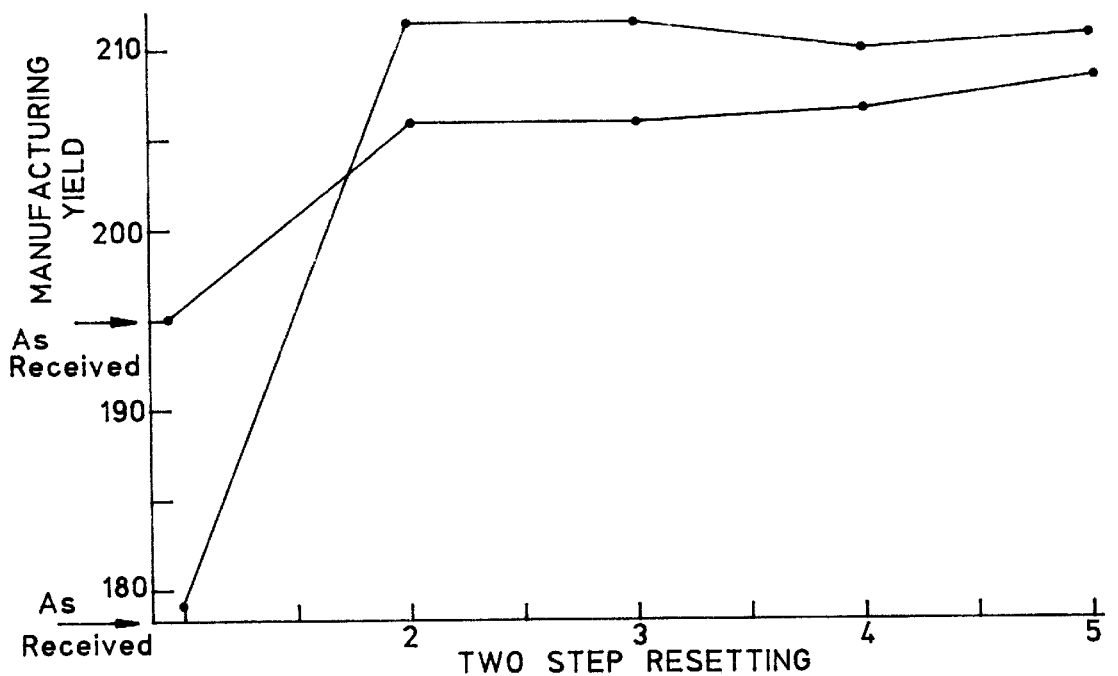
FIG. 30 is a graph illustrating the improvement in yield of two different types of heads before and after the heads have been reset by the first embodiment of the present invention with different values of the first field shown along the abscissa.

Examples of parameter values obtained during processing according to the first embodiment of the invention (FIGS. 23 and 24) are shown in various charts in FIGS. 28–37. The charts in FIGS. 28 and 29 show improvement in signal output and less read signal asymmetry, respectively. Read signal asymmetry stability sigma is the percentage standard deviation of a head from the mean. With reference to FIG. 28, 44 spin valve heads in a row of heads were tested. The bottom jagged line shows the read signal output in microvolts ($\mu v$) for each of the 44 spin valve heads as received after processing, dicing into a row, and lapping, and the top jagged line shows the read signal output in $\mu v$ for the same heads after the steps of the first embodiment of the invention were employed. It can be seen from this chart that the present invention improved the read signal output of most of the heads. In FIG. 29, the top line indicates the read signal asymmetry stability sigma in percentages for each of 44 heads on the row of heads, as received, and the bottom line indicates the read signal asymmetry stability sigma of the same heads after the first embodiment of the invention is implemented. A lower level on the ordinate indicates a lower read signal asymmetry. It can be seen from this chart that the present invention improves the read signal symmetry of some of the magnetic heads.

Figure 31:
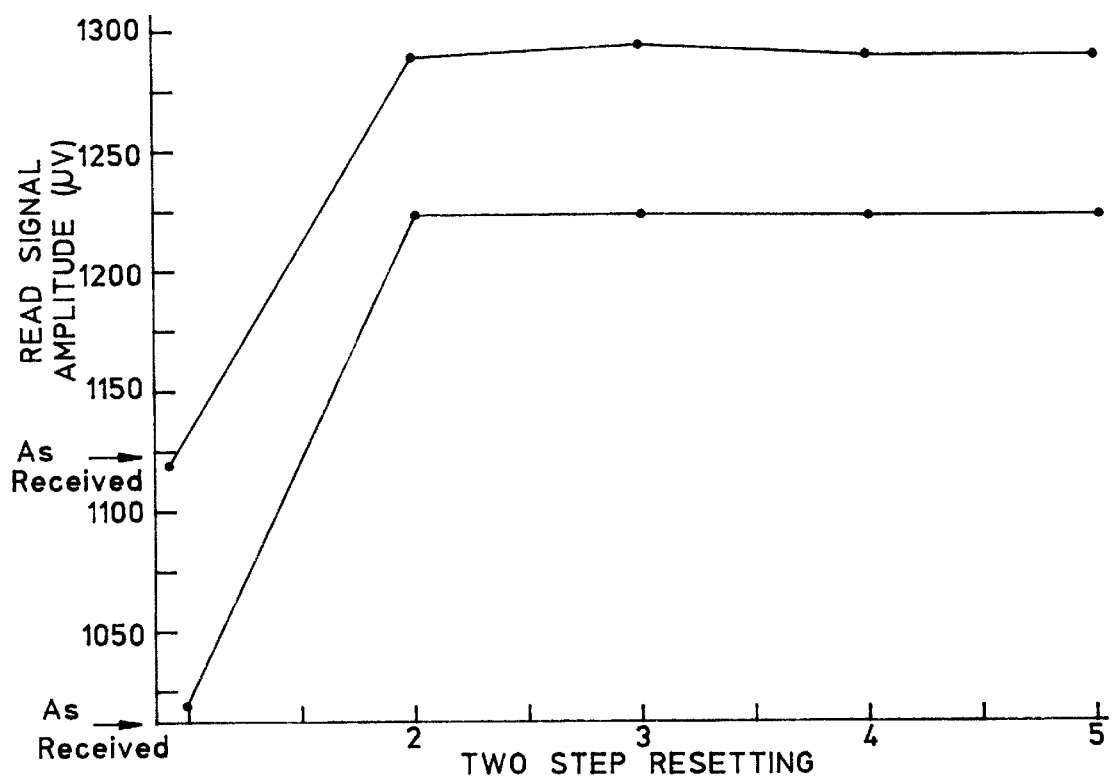
FIG. 31 is a graph illustrating the improvement in yield of two different types of spin valve heads before and after the heads are subjected to resetting with the first embodiment of the present invention with various values of first field being shown along the abscissa.
Figure 32:
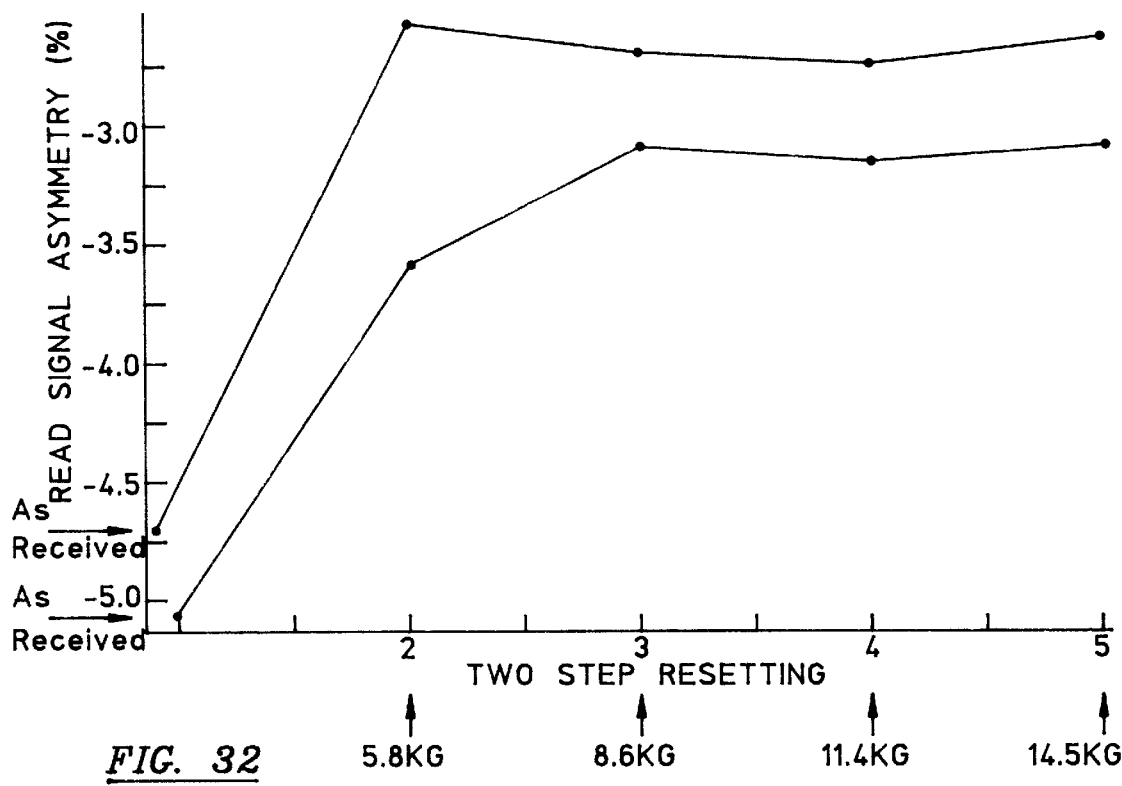
FIG. 32 is a graph illustrating a comparison between before and after resetting with the first embodiment of the present invention of two different types of spin valve heads with different values of the first field being shown along the abscissa.
Figure 33:
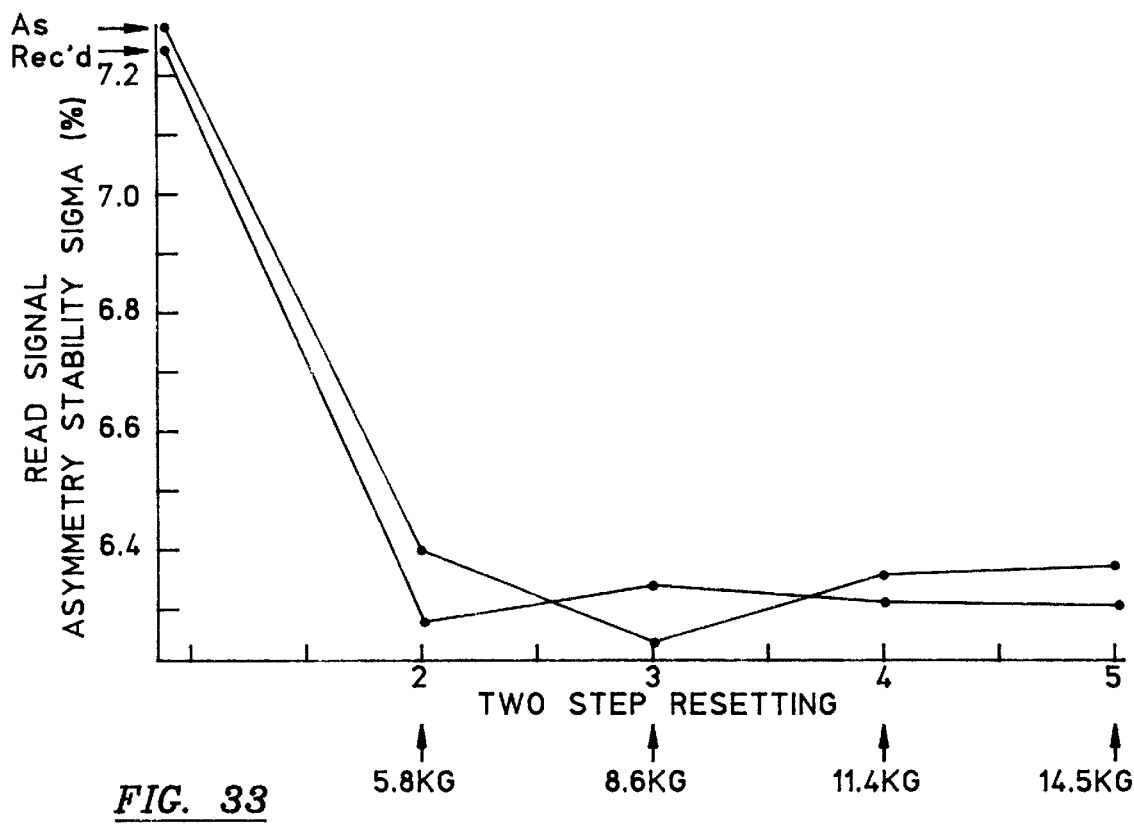
FIG. 33 is a graph illustrating a comparison of the asymmetric stability sigma of the read signal before and after resetting two different types of heads with the first embodiment of the present invention with various values of the first field being shown along the abscissa.

With reference to FIGS. 30–33, two different types of spin valve heads were tested, as received in the row level, and then tested with various levels of the first magnetic field applied according to the present invention. In these tests the second magnetic field applied parallel to the ABS was always 4.5 kilogauss. It can be seen from FIG. 30 that the manufacturing yield was significantly increased when the first magnetic field was 5.8 kilogauss. When the first magnetic field was increased above 5.8 kilogauss, there was a slight increase in the yield up to 14.5 kilogauss. In FIG. 31, the read signal output was significantly increased when the first magnetic field was 5.8 kilogauss. When the first magnetic field was increased above 5.8 kilogauss, up to 14.5 kilogauss, there was no significant increase in the read signal output for either type of head. In FIG. 32 read signal asymmetry of one of the heads was significantly lowered up to 5.8 kilogauss and read signal asymmetry of the other head was significantly lowered up to 8.6 kilogauss. When these levels were exceeded, up to 14.5 kilogauss, a slight lowering of read signal asymmetry was obtained. Read signal asymmetry is the difference between the positive and negative read signals of a head divided by the maximum positive or negative read signal. In FIG. 33 it can be seen that in the one type of spin valve head, the read signal stability sigma was lowered significantly when the first magnetic field was 5.8 kilogauss and the read signal asymmetry stability sigma for the second head was significantly lowered up to 8.6 kilogauss. Above these levels, up to 14.5 kilogauss, the read signal asymmetry stability sigma stayed about the same for the first head while the read signal asymmetry stability sigma increased for the second head.

Figure 34:
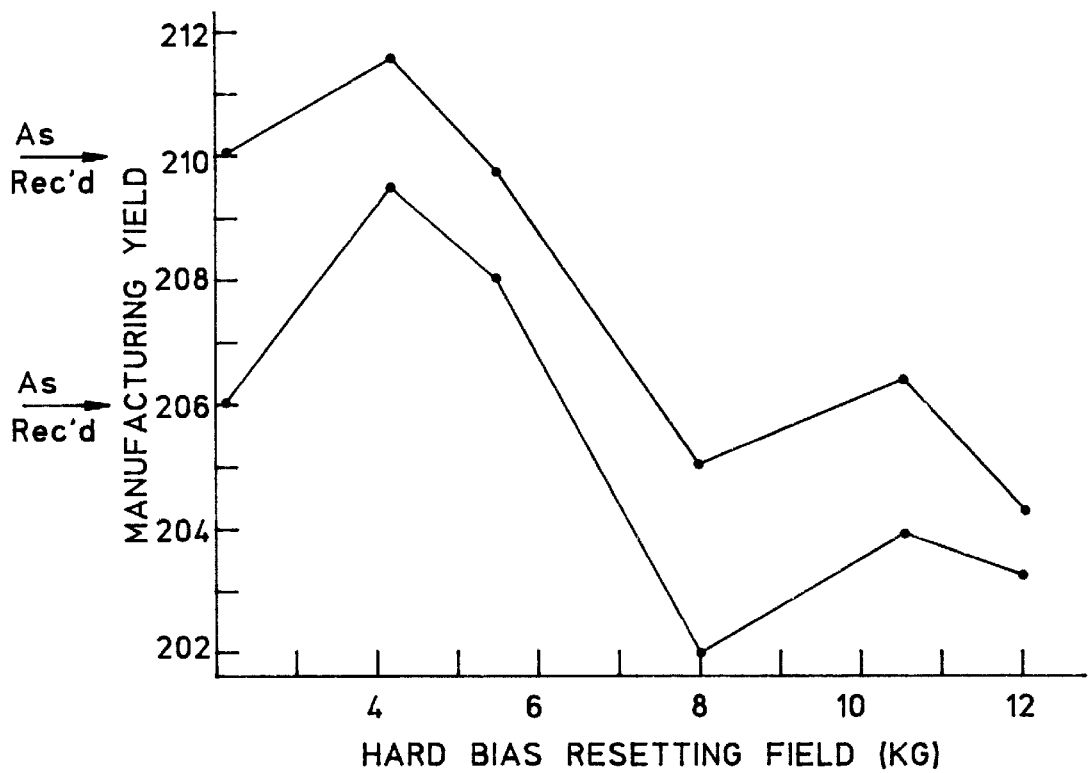
FIG. 34 is a graph illustrating a comparison of the yield of a number of heads before and after applying the second field for resetting the biasing layers of each spin valve head with various values of the second field being shown along the abscissa.
Figure 35:
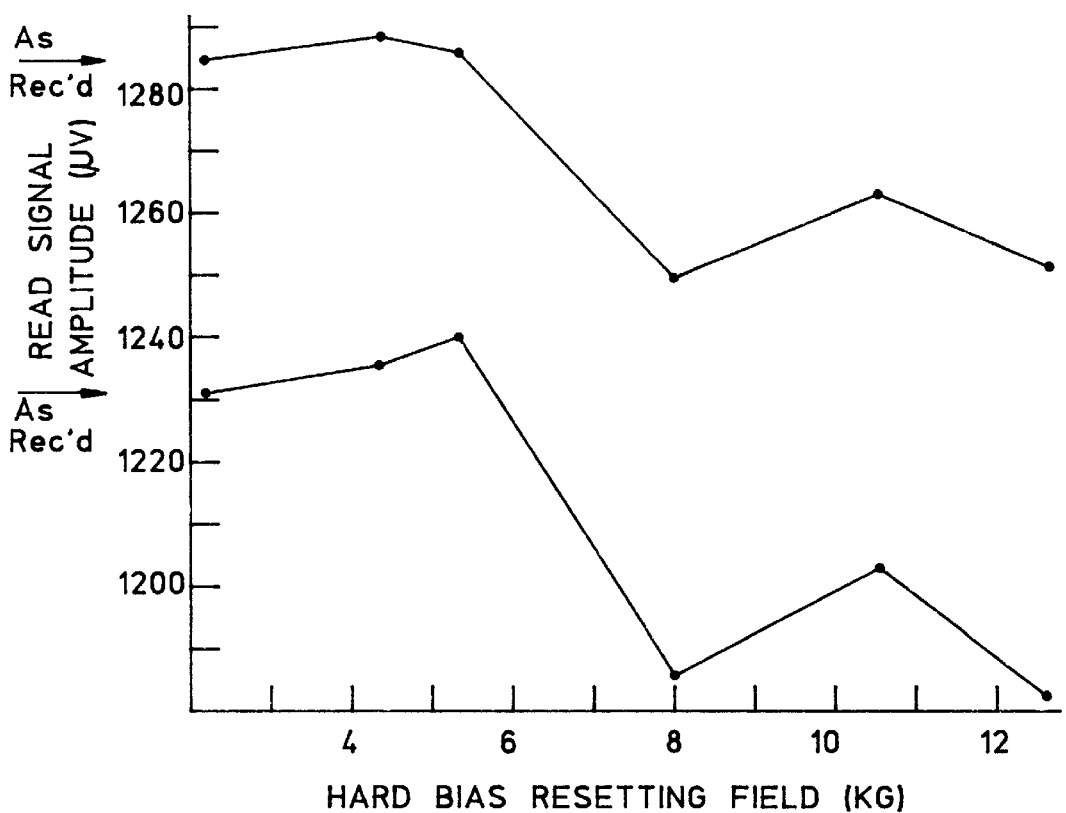
FIG. 35 is a graph illustrating a comparison between a number of heads before and after resetting with the second field for resetting the biasing layers of each head with various values of the second field being shown along the abscissa.
Figure 36:
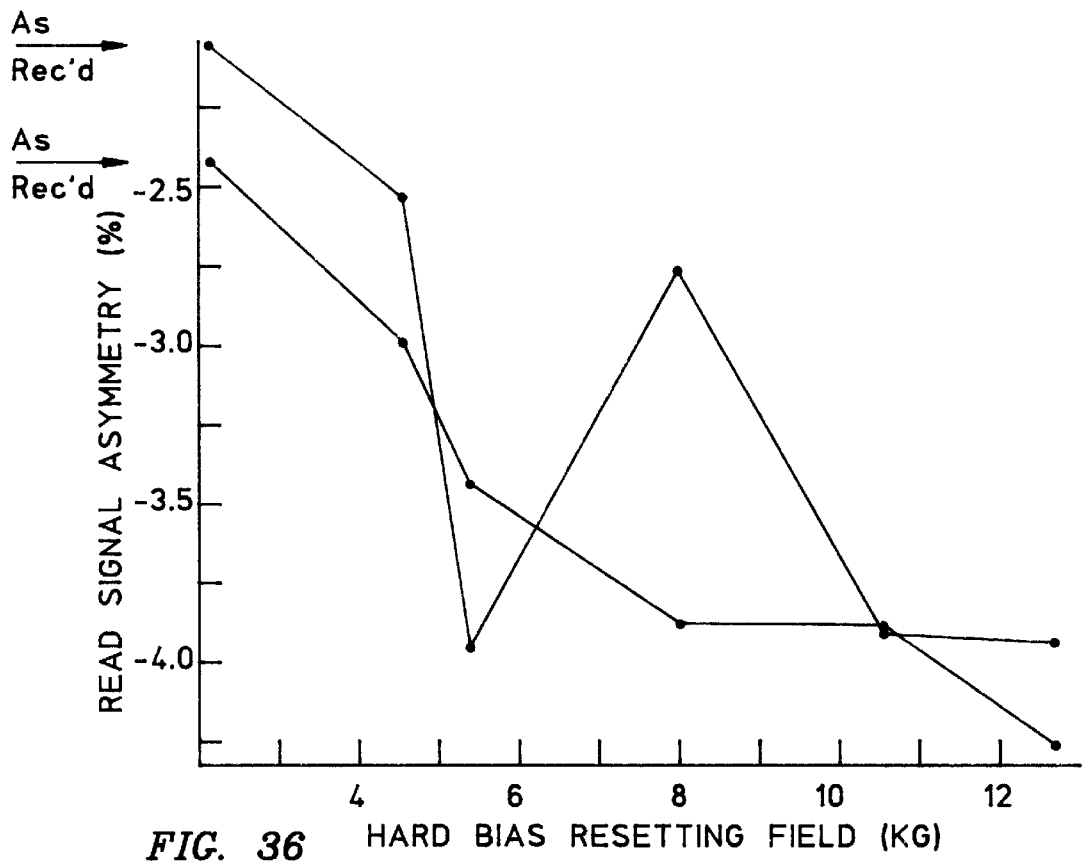
FIG. 36 is a graph illustrating read signal asymmetry of a number of spin valve heads before and after the second field is applied for resetting the pinned layer of each spin valve head with various values of the second field being shown along the abscissa.
Figure 37:
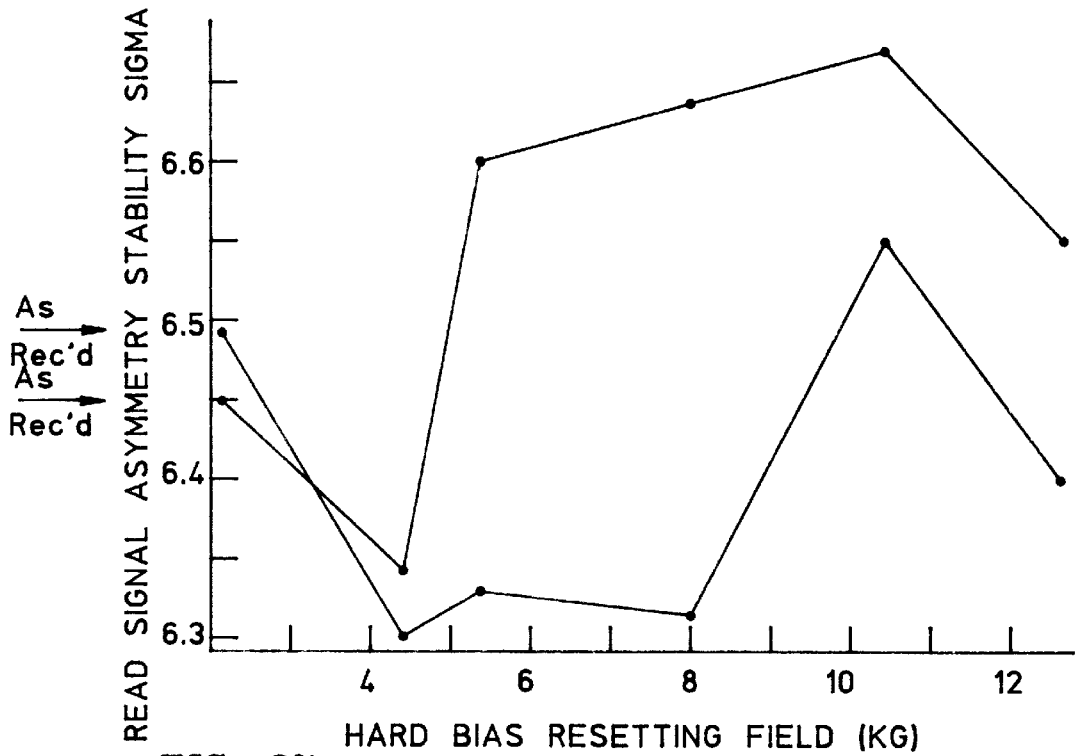
FIG. 37 is a graph illustrating asymmetry stability sigma of the read signal before and after resetting of a number of spin valve heads with the second field for resetting the biasing layers of a plurality of heads with various values of the second field being shown along the abscissa.

FIGS. 34–37 show graphs obtained by testing the biasing layers for two different types of spin valve heads. In FIG. 34, the manufacturing yield increased for both types of heads when the second magnetic field was about 4.5 kilogauss. When the second magnetic field was greater than 4.5 kilogauss, the yield decreased for both heads. In FIG. 35, the read signal output of both heads slightly increased when the second magnetic field was about 5 kilogauss, and decreased when the second magnetic field was increased above 5 kilogauss. In FIG. 36, the read signal asymmetry for the first head increased up to approximately 5 kilogauss, then increased when 8 kilogauss was applied, and then decreased when the second magnetic field was about 13 kilogauss. Read signal asymmetry for the second head increased when the second magnetic field was approximately 8 kilogauss, and stayed about the same when the second magnetic field was increased above 8 kilogauss. In FIG. 37, the read signal asymmetry stability sigma of the first head decreased when the first magnetic field was 4.5 kilogauss, stayed about the same up to 8 kilogauss, then increased when the second magnetic field went to 10 kilogauss, and then decreased when the second magnetic field went to approximately 13 kilogauss. The read signal asymmetry stability sigma for the second head decreased when the second magnetic field was approximately 4.5 kilogauss, then increased when the second magnetic field went to 10 kilogauss, and then decreased when the second magnetic field was increased above 10 kilogauss.

From these charts it can be seen that the preferred first magnetic field is about 5.8 kilogauss, and the preferred second magnetic field is about 4.5 kilogauss. It should be understood that, when the second embodiment of the invention, shown in FIGS. 25–27, is employed, the yield will be increased even more, since the pinning layer will be reset in addition to the pinned and the biasing layers.

Clearly, other embodiments and modifications of this invention will occur readily to those of ordinary skill in the art in view of these teachings. Therefore, this invention is to be limited only by the following claims, which include all such embodiments and modifications when viewed in conjunction with the above specification and accompanying drawings.

We claim:

1. A method of resetting magnetization of a spin valve head that includes a pinning layer immediately adjacent a pinned layer for pinning a magnetic moment of the pinning layer substantially transverse to an air bearing surface (ABS) of the head, a spacer layer between the pinned layer, and a free layer, a magnetoresistance of the head being proportional to a relative angle between magnetic moments of the free layer and the pinned layer, the head further including biasing layers adjacent opposite ends of the free layer for biasing the magnetic moment of the free layer substantially parallel to the ABS, comprising:

at a temperature less than the blocking temperature of the pinning layer, applying a first magnetic field substantially perpendicular to the ABS for resetting the magnetic moment of the pinned layer substantially perpendicular to the ABS; and after applying the first magnetic field, applying a second magnetic field substantially parallel to the ABS for resetting the magnetic moments of the biasing layers substantially parallel to the ABS.

2. A method as claimed in claim 1 wherein a magnitude of the first magnetic field is greater than a magnitude of the second magnetic field.

3. A method as claimed in claim 2 wherein the spin valve head includes a single pinned layer.

4. A method as claimed in claim 3 wherein the first magnetic field has a magnitude from 5.0 Kg to 14.5 Kg and the second magnetic field has a magnitude from 2.5 Kg to 5.0 Kg.

5. A method as claimed in claim 4 further including:

providing a plurality of rows and columns of said heads on a substrate;

cutting the substrate into rows; and applying each of said first and second fields to a plurality of heads on at least one row of heads.

6. A method as claimed in claim 5 wherein a magnitude of the second magnetic field is substantially 4.5 kilogauss.

7. A method as claimed in claim 6 wherein a magnitude of the first magnetic field is substantially 14.5 kilogauss.

8. A method as claimed in claim 2 wherein the spin valve head is an anti-parallel (AP) pinned spin valve head that has first and second pinned layers that are separated by an antiparallel (AP) coupling layer.

9. A method as claimed in claim 8 wherein the first magnetic field has a magnitude from 5.0 Kg to 14.5 Kg and the second magnetic field has a magnitude from 2.5 Kg to 5.0 Kg.

10. A method as claimed in claim 9 further including:

providing a plurality of rows and columns of said heads on a substrate;

cutting the substrate into rows; and applying each of said first and second fields to a plurality of heads on at least one row of heads.

11. A method as claimed in claim 10 wherein a magnitude of the second magnetic field is substantially 4.5 kilogauss.

12. A method as claimed in claim 11 wherein a magnitude of the first magnetic field is substantially 14.5 kilogauss.

13. A method as claimed in claim 1 further including:

constructing a plurality of rows and columns of spin valve heads on a wafer, the wafer having an air bearing surface (ABS) plane defined by ABS sites of the heads;

heating the wafer until a temperature of the pinning layers is or exceeds a blocking temperature of the pinning layers;

applying a first initial magnetic field substantially perpendicular to the ABS plane for setting magnetic moments of the pinning and pinned layers of the heads substantially perpendicular to the ABS sites;

applying a second initial magnetic field substantially parallel to the ABS plane for setting magnetic moments of the biasing layers substantially parallel to the ABS sites;

cutting the wafer into to rows of spin valve heads; and applying said first and second fields to at least one row of spin valve heads.

14. A method as claimed in claim 13 wherein a magnitude of the first magnetic field is greater than a magnitude of the second field.

15. A method as claimed in claim 14 wherein the first magnetic field has a magnitude from 5.0 Kg to 14.5 Kg and the second magnetic field has a magnitude from 2.5 Kg to 5.0 Kg.

16. A method as claimed in claim 15 wherein the spin valve head includes a single pinned layer.

17. A method as claimed in claim 16 wherein a magnitude of the first magnetic field is substantially 14.5 kilogauss and a magnitude of the second magnetic field is substantially 4.5 kilogauss.

18. A method as claimed in claim 15 wherein the spin valve head is an antiparallel (AP) pinned spin valve head that has first and second pinned layers that are separated by another spacer layer, the first pinned layer being said pinned layer that is immediately adjacent said pinning layer.

19. A method as claimed in claim 18 wherein a magnitude of the first magnetic field is substantially 14.5 kilogauss and a magnitude of the second magnetic field is substantially 4.5 kilogauss.

20. A method of resetting a spin valve head that includes a pinning layer immediately adjacent a pinned layer for pinning a magnetic moment of the pinning layer substantially transverse to an air bearing surface (ABS) of the head, a spacer layer between the pinned layer, and a free layer, a magnetoresistance of the head being proportional to a relative angle between magnetic moments of the free layer and the pinned layer, the head further including biasing layers adjacent opposite ends of the free layer for biasing the magnetic moment of the free layer substantially parallel to the ABS, first and second terminals, first and second leads, the first lead having a first end connected to first ends of the pinned, spacer and free layers and a second end connected to the first terminal, and the second lead having a first end connected to second ends of the pinned, spacer and free layers and a second end connected to the second terminal for conducting a sense current $I_S$ to the pinned, pacer and free layers, the method comprising:

applying heat internally within the head for heating the pinning layer;

while heating the pinning layer, applying a first magnetic field substantially perpendicular to the ABS for setting orientation of the magnetic spins of the pinning layer and the magnetic moment of the pinned layer substantially perpendicular to the ABS; and after applying the first magnetic field, applying a second magnetic field substantially parallel to the ABS for setting the magnetic moments of the biasing layers substantially parallel to the ABS.

21. A method as claimed in claim 20 wherein applying heat internally within the head includes applying a current pulse to the first and second terminals.

22. A method as claimed in claim 21 wherein the heating heats the pinning layer to or greater than its blocking temperature.

23. A method as claimed in claim 22 wherein the sense current $I_S$ is generated in response to a first voltage and the current pulse is generated in response to a second voltage that is greater in magnitude than the first voltage.

24. A method as claimed in claim 23 wherein a magnitude of the first magnetic field is substantially 14.5 kilogauss.

25. A method as claimed in claim 24 further including:

providing a plurality of rows and columns of said heads on a substrate;

cutting the substrate into rows; and applying each of said first and second fields to a plurality of heads on at least one row of heads.

26. A method as claimed in claim 25 wherein the spin valve head includes a single pinned layer.

27. A method as claimed in claim 26 wherein each of the first and second fields is approximately 5 kilogauss.

28. A method as claimed in claim 27 wherein the voltage of the current pulse is approximately twice the voltage of the sense current.

29. A method as claimed in claim 28 wherein the current pulse has a duration of approximately 75 nanoseconds.

30. A method as claimed in claim 29 wherein the current pulse has a rise time of approximately 7 nanoseconds and a decay time of approximately 30 nanoseconds.

31. A method as claimed in claim 25 wherein the spin valve head is an anti-parallel (AP) pinned spin valve head that has first and second pinned layers that are separated by an antiparallel (AP) coupling layer.

32. A method as claimed in claim 31 wherein each of the first and second fields is approximately 5 kilogauss.

33. A method as claimed in claim 32 wherein the magnitude of the second voltage is approximately twice the magnitude of the first voltage of the sense current.

34. A method as claimed in claim 33 wherein the current pulse has a duration of approximately 75 nanoseconds.

35. A method as claimed in claim 34 wherein the current pulse has a rise time of approximately 7 nanoseconds and a decay time of approximately 30 nanoseconds.

36. A method as claimed in claim 20 further including:

constructing a plurality of rows and columns of spin valve heads on a wafer, the wafer having an air bearing surface (ABS) plane defined by ABS sites of the heads;

heating the wafer until a temperature of the pinning layers is or exceeds a blocking temperature of the pinning layers;

applying a first initial magnetic field substantially perpendicular to the ABS plane for setting magnetic moments of the pinning and pinned layers of the heads substantially perpendicular to the ABS sites;

applying a second initial magnetic field substantially parallel to the ABS plane for setting magnetic moments of the biasing layers substantially parallel to the ABS sites;

cutting the wafer into to rows of spin valve heads; and applying said first and second fields to at least one row of spin valve heads.

37. A method as claimed in claim 36 wherein applying heat internally within the head includes applying a current pulse to the first and second terminals.

38. A method as claimed in claim 37 wherein the heating heats the pinning layer to or greater than its blocking temperature.

39. A method as claimed in claim 38 wherein the sense current $I_S$ has a voltage and the current pulse has a voltage that is greater than the voltage of the sense current $I_S$.

40. A method as claimed in claim 39 wherein a magnitude of the first magnetic field is substantially 14.5 kilogauss.

41. A method as claimed in claim 40 further including:

providing a plurality of rows and columns of said heads on a substrate;

cutting the substrate into rows; and applying each of said first and second fields to a plurality of heads on at least one row of heads.

42. A method as claimed in claim 41 wherein the spin valve head includes a single pinned layer.

43. A method as claimed in claim 41 wherein the spin valve head is an anti-parallel (AP) pinned spin valve head that has first and second pinned layers that are separated by an antiparallel (AP) coupling layer.

\* \* \* \* \*